United States Patent
Dickerson, Jr. et al.

(10) Patent No.: US 6,763,843 B1
(45) Date of Patent: *Jul. 20, 2004

(54) AUTOMATICALLY SWITCHING VALVE WITH REMOTE SIGNALING

(75) Inventors: William H. Dickerson, Jr., 2502 Technology Dr., Hayward, CA (US) 94545; Paul D. Primrose, San Jose, CA (US)

(73) Assignee: William H. Dickerson, Jr., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/339,686

(22) Filed: Jan. 8, 2003

Related U.S. Application Data

(63) Continuation of application No. 09/828,696, filed on Apr. 6, 2001, now Pat. No. 6,536,456, which is a continuation of application No. 09/248,328, filed on Feb. 9, 1999, now abandoned, which is a continuation of application No. 08/810,575, filed on Mar. 3, 1997, now Pat. No. 5,868,162.

(51) Int. Cl.$^7$ .............................................. G05D 11/00

(52) U.S. Cl. .............................. 137/1; 137/12; 137/113; 137/557

(58) Field of Search ................................ 137/1, 12, 113, 137/487.5, 551, 557; 251/129.04

(56) References Cited

U.S. PATENT DOCUMENTS

| | | | | | |
|---|---|---|---|---|---|
| 2,768,640 | A | * | 10/1956 | Zimmer et al. | 137/113 |
| 3,033,220 | A | * | 5/1962 | St. Clair | 137/113 |
| 3,550,613 | A | * | 12/1970 | Barber | 137/113 |
| 5,062,443 | A | * | 11/1991 | Maric | 137/113 |
| 5,422,014 | A | * | 6/1995 | Allen et al. | 210/743 |
| 5,868,162 | A | * | 2/1999 | Dickerson, Jr. | 137/557 |
| 6,536,456 | B2 | * | 3/2003 | Dickerson et al. | 137/12 |

OTHER PUBLICATIONS

"Product Spotlight: Cylinder Equipment," *CryoGas International Magazine*, Oct. 1999, vol. 37, No. 9.

* cited by examiner

*Primary Examiner*—Stephen M. Hepperle
(74) *Attorney, Agent, or Firm*—James D. Ivey

(57) ABSTRACT

A programmable circuit detects drop in pressure of a supplied pressurized gas below a predetermined threshold pressure and automatically switches to a different supply of pressurized gas and automatically contacts a remotely located host computer. The circuit sends status data to the host computer and enters a server mode in which the circuit performs commands issued by the host computer. The commands include commands to change data of the programmable circuit and to download new programming. The predetermined threshold pressure is established by manually setting the supplied pressurized gas to a desired pressure and causing the programmable circuit to measure the pressure of supplied gas and to store the measured pressure as the threshold pressure.

6 Claims, 17 Drawing Sheets

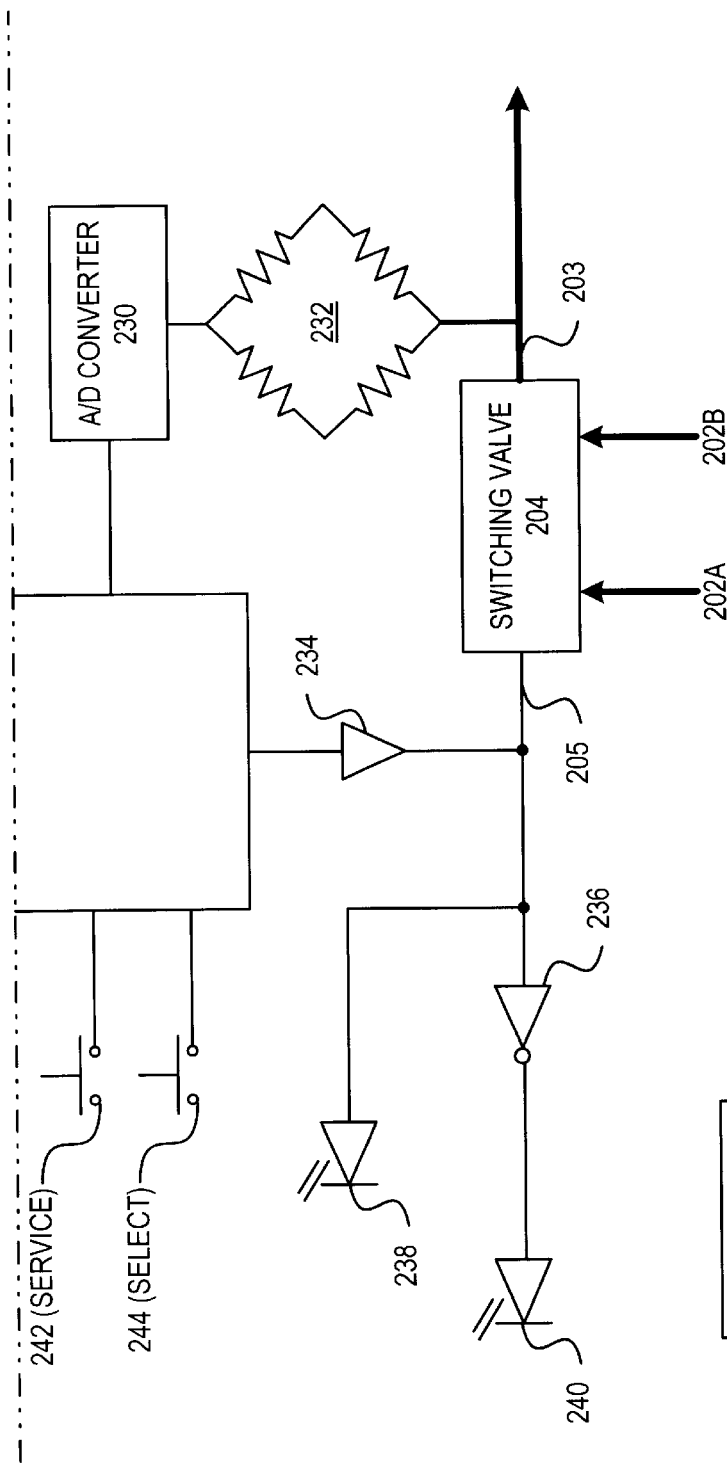

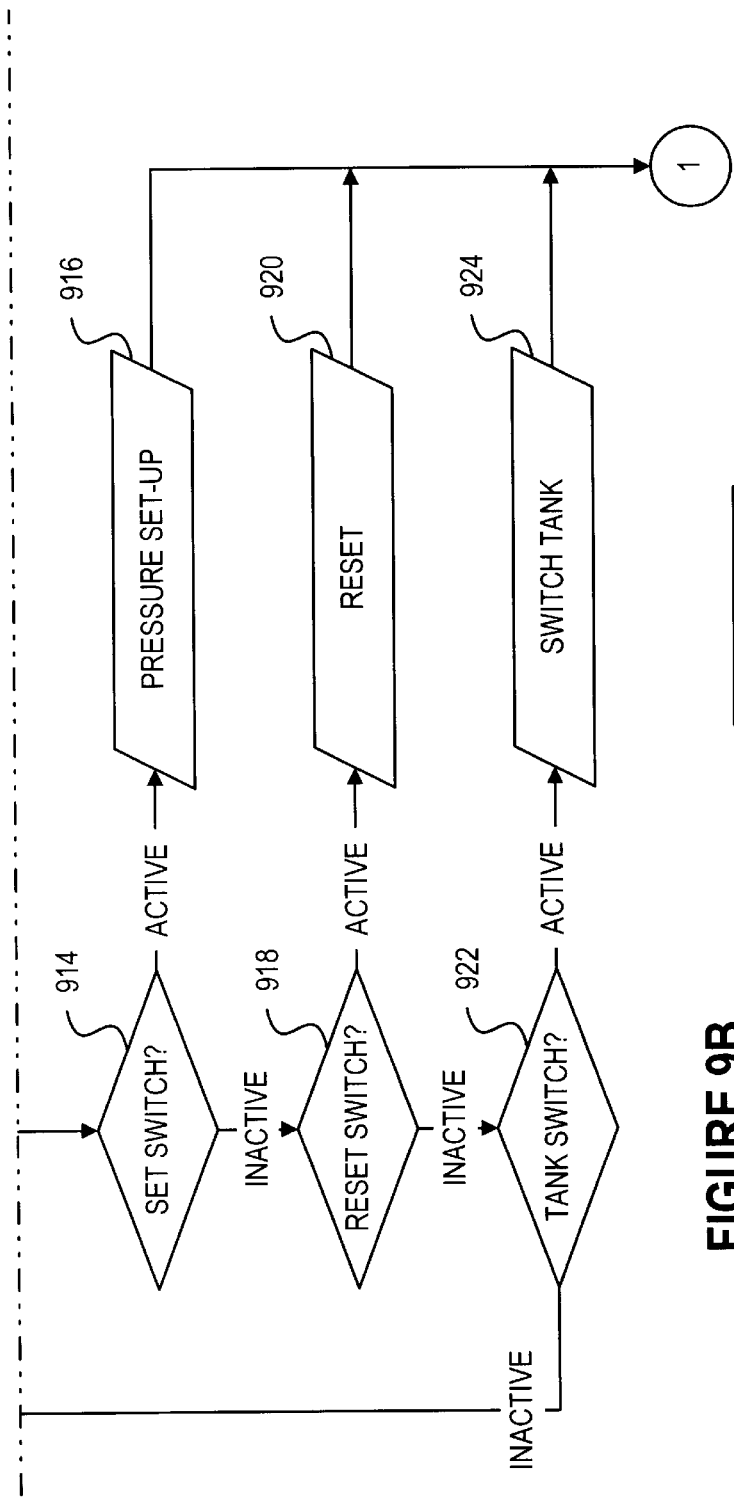
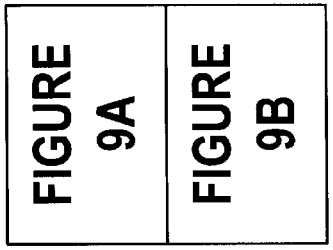
FIGURE 9B
FIGURE 9

AUTOMATICALLY SWITCHING VALVE WITH REMOTE SIGNALING

SPECIFICATION

This is a continuation of U.S. patent application Ser. No. 09/828,696 filed Apr. 6, 2000 (now U.S. Pat. No. 6,536,456), which is a continuation of U.S. patent application Ser. No. 09/248,328 filed Feb. 9, 1999 now abandoned, which is a continuation of U.S. patent application Ser. No. 08/810,575 filed Mar. 3, 1997 (now U.S. Pat. No. 5,868,162).

FIELD OF THE INVENTION

The present invention relates to systems for delivering pressurized gas and, in particular, to a system which switches from one pressurized gas supply to another upon automatic detection of a reduction in pressure in the former pressurized gas supply.

BACKGROUND OF THE INVENTION

Pressurized gas is used in a number of applications ranging from carbonated beverage dispensers to oxygen systems used in medical and high-altitude environments. Pressurized gas is typically provided in pressurized tanks which release gas at a predetermined pressure through a regulator. When most of the gas has been dispensed from a particular tank, the gas pressure drops to a level below that which is necessary for the intended application. In the case of carbonated beverage dispensers, the dispensed beverages cease to be carbonated, i.e., become "flat." The tank is then typically replaced with a new, full tank of pressurized gas. However, manual tank replacement can be particularly inconvenient. For example, replacing an empty tank of carbon dioxide during lunch at a restaurant may be particularly inconvenient since no personnel may be available to effect the replacement. However, consumers generally prefer beverages carbonated and sales generally drop when carbonated beverages are not available in a particular dining establishment.

To address this problem, valves which automatically detect a reduction in pressure in a first tank and automatically switch to a second tank in response thereto have been developed.

U.S. Pat. No. 5,014,733 to Wilson dated May 14, 1991 describes one such valve. The valve of the '733 patent uses mechanical devices to sense a drop in pressure and switches from a first supply tank to a second, full supply tank in response to the pressure drop.

To automatically trip the switching valve, the relatively high pressures of pre-regulated pressurized gas are required. Therefore, the switching value of the '733 patent is typically placed between the supply tanks and a regulator. Such generally has two primary drawbacks. The first is that the valve switches to the second supply tank when the first supply tank is not quite empty. Supply tanks generally store gas whose pressure can be as high as 2,500 psi and is regulated to about 100 psi for use in end-user equipment, e.g., carbonated beverage dispenser. Because of imprecision in mechanical switching mechanisms, conventional valves are adjusted to switch from the first supply tank to the second supply tank when the pressure of the gas in the first supply tank drops to about 200 psi. If such conventional valves were configured to switch at a lower pressure, the valve might not switch even if the pressure of the gas in the first supply tank dropped below 80 psi at which end-user equipment might become inoperative. However, even at 200 psi, pressurized gas in liquid form is still present in the first supply tank. Such premature discontinuation of use of the first supply tank results in unnecessary costs and waste since a substantial amount of the gas is never used.

The second drawback of switching unregulated gas is that such conventional switching valves cannot be used with newer, bulk pressurized gas tanks which hold a much larger quantity of pressurized gas at a lower pressure, i.e., typically about 230 psi. Since such conventional valves are configured to switch from the first supply tank to the second supply tank when the pressure of the first tank drops below about 200 psi, such a conventional valve would switch before much of the pressurized gas in the bulk system is used. Such bulk systems require a much more precise switching mechanism.

Conventional switching valves such as that described in the '733 patent suffer from further disadvantages. For example, conventional valves only switch from the first supply tank to the second supply tank. When the pressure in the second supply tank drops below the threshold pressure, the valve must generally be manually reset to again supply pressurized gas from the first supply tank to the end-user equipment. By this time, the first supply tank which was previously empty hopefully has been replaced with a new first supply tank which is full. However, the user is not informed that the second supply tank is nearly empty and the end-user equipment must generally become inoperative before the user knows to replace the second supply tank. Unfortunately, depletion of the second supply tank is also generally the first time the user is informed that the first supply tank is empty as well. Without careful observation by the user, the user is not informed that the valve has switched from the first supply tank to the second supply tank and, frequently, the first supply tank is not replaced until the second supply tank becomes empty. In this respect, such conventional automatically switching valves are no better than no switching valve at all except that the capacity of the first supply tank can be effectively doubled by adding the second supply tank.

SUMMARY OF THE INVENTION

In accordance with the present invention, a smart switch uses a microprocessor to monitor a pressure of gas supplied by a selected one of two or more pressurized gas supplies. When the gas pressure falls below a predetermined threshold pressure, the smart switch decouples the selected pressurized gas supply from down-line equipment using the pressurized gas and couples a different pressurized gas supply to the equipment. In addition, the smart switch, upon detecting the falling gas pressure, communicates the low gas pressure and change of pressurized gas supplies—along with status of the smart switch itself—to a remotely located computer system which is sometimes referred to as the host computer. The remotely located computer system then dispatches service personnel to the location of the smart switch to replace the empty pressurized gas supply and to perform general maintenance of the pressurized gas system there.

The smart switch senses regulated pressurized gas such that lower gas pressures are handled. In addition, the measured gas pressure is accurate to within about one-half pound-per-square-inch (psi). Accordingly, the predetermined threshold pressure can be set sufficiently low (e.g., 80 psi) that all pressurized gas in liquid form has been used yet sufficiently high that the equipment using the pressurized gas is still operative. In addition, such a system can effectively monitor gas supplied by large, bulk pressurized tanks which operate at significantly lower pressures than older, smaller, high pressure tanks.

In communicating with the host computer, the smart switch identifies itself by sending identification data and authenticates itself by sending associated passcode data. The smart switch further sends data representing the status of the smart switch include a log of any errors encountered during operation of the smart switch, status of each pressurized gas supply tank controlled by the smart switch, and the version of control firmware used by the smart switch. Once this information is communicated to the host computer, the smart switch enters a server mode in which the host computer issues commands to the smart switch. As a result, a cracker posing as a smart switch is unable to control communications with the host computer to obtain customer information or other sensitive information.

Once the smart switch has entered the server mode, the host computer determines whether any changes must be made to the smart switch. Such changes include new access information, such as a telephone number by which the smart switch contacts the host computer; new identification data for the smart switch; a new passcode for authentication of the smart switch; new service authorization data; and new programming for the smart switch. If any changes are needed, the host computer issues a download command and sends the necessary item to be changed.

The predetermined threshold pressure of the smart switch is field-programmable. Specifically, a service technician causes the smart switch to enter a pressure set-up mode, establishes a desired pressure at the switchable valve monitored by the smart switch, and presses a set button to cause the smart switch to note the pressure. The smart switch stored the measured pressure as the new predetermined threshold pressure at which smart switch determines a pressurized gas supply is empty.

DETAILED DESCRIPTION

Figure 1:
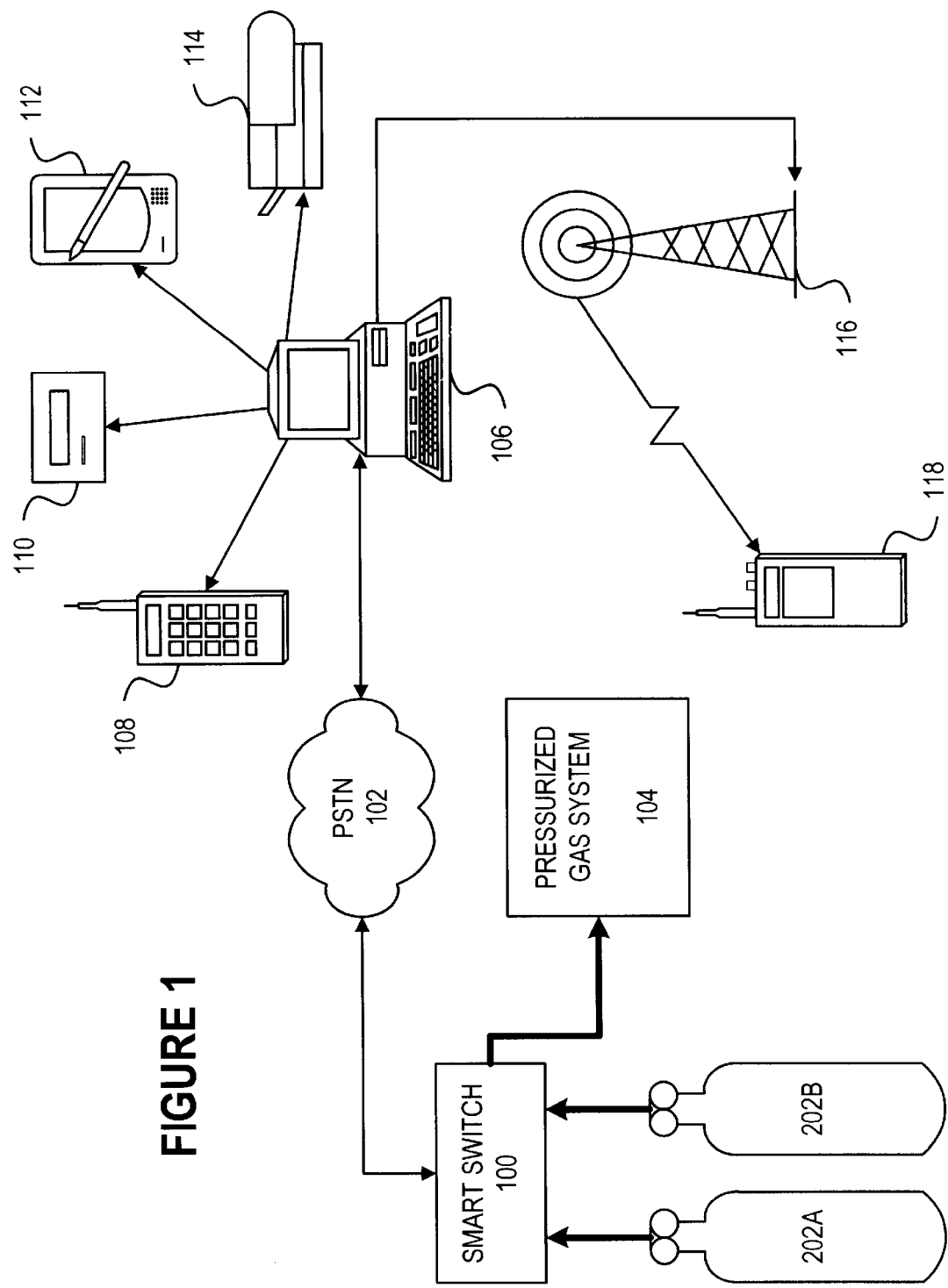
FIG. 1 is a block diagram of a smart switch and remotely located computer system according to the present invention.

In accordance with the present invention, a smart switch 100 (FIG. 1) senses a drop in pressure of pressurized gas supplied by one of two pressurized gas supplies 202A–B and triggers an automatic switch to the other of supplies 202A–B and automatic transmission of a signal to a host computer 106 to indicate that one of supplies 202A–B is empty. Smart switch 100 sends the signal through public-switched telephone network (PSTN) 102 to host computer 106 in a manner described more completely below. Host computer 106 can report the switching between supply tanks 202A–B to remote devices such as a cellular phone 108, a pager 110, a personal digital assistant (PDA) 112, a printer 114, or a remote radio 118 through a radio transmission tower 116. Accordingly, information regarding the need for additional pressurized gas at a particular customer location can be communicated immediately to a delivery truck en route.

Figure 2A:
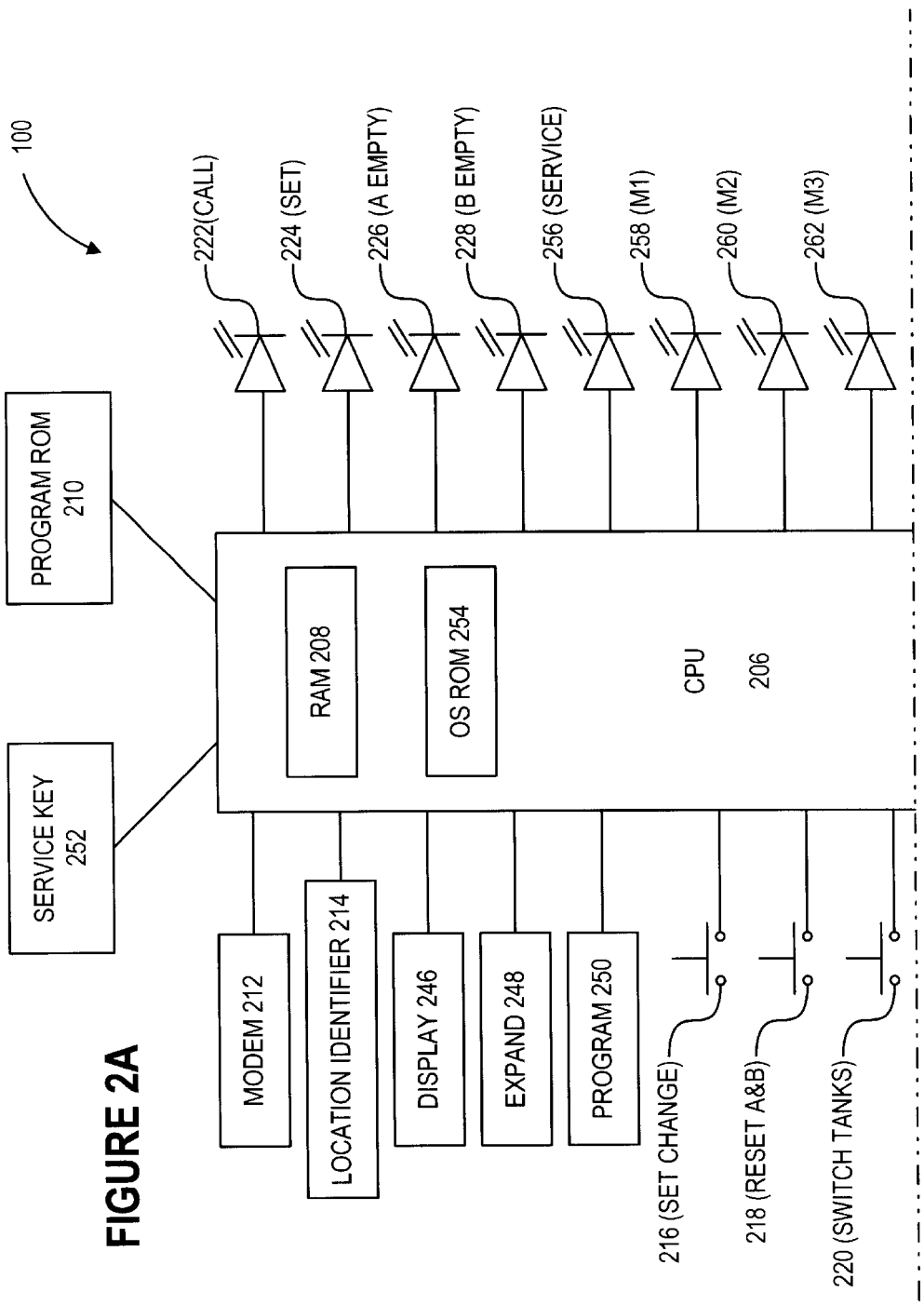
FIG. 2 is a block diagram of the smart switch of FIG. 1 in greater detail.

Smart switch 100 is shown in greater detail in FIG. 2. Smart switch 100 includes a switching value 204 which selects an input from either supply tank 202A or supply tank 202B, connecting that input line with output line 203 and thus supplying pressurized gas system 104 (FIG. 1), in accordance with a signal received on control line 205 (FIG. 2). A microprocessor (central processing unit, CPU) 206 controls switching valve 204 through a buffer 234 according to computer instructions and data retrieved from program read-only memory (ROM) 210. In carrying out the behavior specified by the computer instructions and data stored in program ROM 210, CPU 206 also uses computer instructions and data stored in a program randomly accessible memory (RAM) 208 and an operating system (OS) ROM 254.

To determine when to switch tanks in accordance with program ROM 210, program RAM 208, and OS ROM 254 as described more completely below; CPU 206 receives a pressure signal from a analog-to-digital converter 230. The pressure signal indicates a pressure measured by a pressure sensor 232 at output line 203. In this illustrative embodiment, pressure sensor 232 is a strain gauge which is exposed to the pressurized gas within outlet line 203.

Smart switch 100 also includes a modem 212 for remotely signaling host computer 106 in a manner described more completely below. Location identifier 214 includes data identifying smart switch 100 uniquely within all smart switches managed by host computer 106 (FIG. 1). In one illustrative embodiment, location identifier 214 is an electronic serial number chip. In an alternative embodiment, location identifier 214 is electrically erasable programmable read-only memory (EEPROM). Smart switch 100 includes a service key connector which receives a service key 252. Service key 252 is carried by authorized service personnel and is used to authorize special service functions which are described below. In this illustrative embodiment, service key 252 includes both a code and an identifier. The code specifies a type of authorized activity such as a category of facilities service of which service key 252 authorizes. The identifier identifies a specific individual service person uniquely among service personnel who maintain pressurized gas installations. Service key 252 can be a smart card for example in which the code and identifier are digitally encoded into circuitry embedded in the smart card. Similarly, service key 252 can be a plastic card with a magnetic strip on which the code and identifier are encoded.

In an alternative embodiment, service key 252 is a conventional metal key and the service key connector is a conventional lock tumbler assembly.

Smart switch 100 also includes an expansion slot 248 for possible inclusion of additional hardware in smart switch 100; a program slot 250 by which a service technician can write new computer instructions and/or data to program ROM 210; and a display port 246 to which service technicians can connect a small display for reading status data of smart switch 100.

Smart switch 100 includes a number of switches for manual control of smart switch 100 by a human operator. Set switch 216, when closed, initiates a pressure calibration by smart switch 100 in a manner described more completely below. Reset switch 218, when closed, resets the state of supply tanks 202A–B within smart switch 100 to non-empty. Tank switch 220, when closed, causes smart switch 100 to switch between tanks 202A–B irrespective of the pressure sensed on output line 203. Service switch 242, when closed, causes smart switch 100 to enter a service mode which is described more completely below. In this illustrative embodiment, service switch 242 is embedded into the port for service key 252 such that insertion of service key 252 activates service key 242. In addition, removal of service key 252 deactivates service switch 242. Select switch 244 is used in the manner described below during establishment of a new predetermined threshold pressure.

Smart switch 100 includes a number of LED (light emitting diode) indicators which represent the current state of smart switch 100. LED 238 indicates whether supply tank 202A is currently connected to output line 203 by switching valve 204. LED 240 indicates whether supply tank 202B is currently connected to output line 203 by switching valve 204. As shown in FIG. 2, LEDs 238–240 are mutually exclusive and are controlled by the same signal which controls which of supply tanks 202A–B is connected to output line 203 through switching valve 204.

Call LED 222 indicates whether transmission of switch status to host computer 104 is pending. Set LED 224 indicates whether smart switch 100 is operating in a normal mode or in a pressure calibration mode. A-empty LED 226 indicates whether supply tank 202A is empty. B-empty LED 228 indicates whether supply tank 202B is empty. Service LED 256 indicates whether smart switch 100 is in the service mode. MI LED 258, M2 LED 260, and M3 LED 262 are used to indicate various states as described more completely below, e.g., with respect to the pressure threshold calibration described below in conjunction with FIG. 10.

Figure 3:
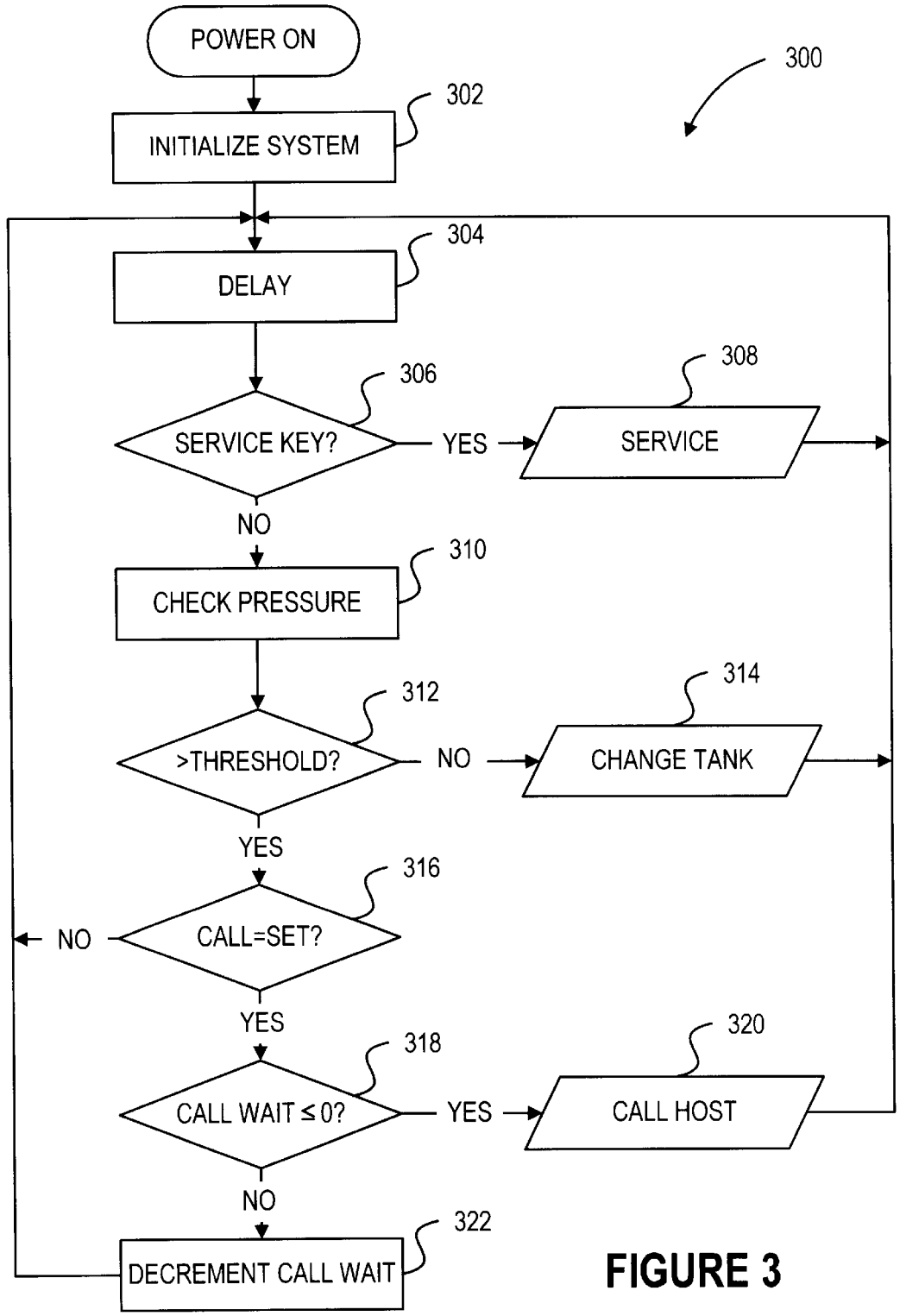
FIG. 3 is a logic flow diagram illustrating processing by the smart switch of FIG. 2.

In this illustrative embodiment, program RAM 208 is internal to, and integral with, CPU 206 and is used for workspace for CPU 206 during operation of smart switch 100. Further in this illustrative embodiment, program ROM 210 is electrically erasable programmable ROM (EEPROM) and contains computer instructions and data which collectively specify the behavior of CPU 206. Such computer instructions and data are sometimes collectively referred to as firmware. The behavior of CPU 206, and thus of smart switch 100, as specified by such firmware is shown as logic flow diagram 300 (FIG. 3).

Processing according to logic flow diagram 300 begins at step 302 when power is applied to smart switch 100, and thus CPU 206. In step 302, CPU 206 initializes the system. In initializing, smart switch 100 verifies that location identifier 214 matches an expected identifier. If not, smart switch 100 detects an error stops processing. If location identifier 214 matches the expected identifier, smart switch 100 retrieves a stored state from location identifier 214 and establishes that state within smart switch 100. Such a state includes individual states of various flags described herein. The respective states of some of the flags are reflected in respective ones of LEDs 222–228, 256–262, and 238–240 such that these LEDs accurately represent the state of smart switch 100 after power is applied. Smart switch 100 also initializes modem 212 as part of initialization of smart switch 100.

In step 304, CPU 206 waits a predetermined amount of time before processing continues. The delay of step 304 allows the frequency of button and pressuring sampling to be controlled. In this illustrative embodiment, the predetermined amount of time is one-half second.

In test step 306, CPU 206 determines whether service switch 242 is active, e.g., whether service key 252 is inserted in this illustrative embodiment. If so, processing transfers to step 308 in which smart switch 100 enters a service mode which is described more completely below. Conversely, if service switch 242 is inactive, e.g., if service key 252 is removed in this illustrative embodiment, processing transfers to test step 310. Smart switch 100 deems service key 252 to not be inserted once an error is recognized with respect to service key 252. Service key errors are set in step 906 which is described more completely below and the service key in error must be removed before smart switch 100 recognizes any inserted service key.

In step 310, CPU 206 samples the pressure of pressurized gas at outlet line 203. In particular, CPU 206 reads a numerical value from analog-to-digital converter 230. Pressure sensor 232 is coupled to outlet line 203 and senses the pressure of the gas within outlet line 203. Since one of supply tanks 202A–B is coupled to outlet line 203 by switching valve 204, sensing the pressure of gas in outlet line 203 simultaneously senses the pressure of gas in the one of supply tanks 202A–B coupled to outlet line. In a manner described more completely below, CPU 206 can be calibrated to sense pressure in outlet line 203 relatively accurately, e.g., within about plus or minus 0.5 psi.

Once the pressure of gas at outlet line 203 is determined in step 310, CPU 206 determines whether the measured pressure is at least the predetermined pressure threshold in test step 312. The predetermined pressure threshold is established by service personnel in a manner described more completely below with respect to FIG. 10. If the measured pressure is less than the predetermined threshold, processing transfers to step 314 in which CPU 206 determines that the current supply tank is empty and changes the current supply tank in a manner described more completely below. Conversely, if the measured pressure is at least the predetermined threshold, processing transfers to test step 316.

In test step 316, CPU 206 (FIG. 2) determines whether a call flag is set. The call flag is data within CPU 206, e.g., within program RAM 208, which indicates whether a call to host computer 106 (FIG. 1) is pending. If the call flag is cleared (i.e., not set), processing transfers to step 304 (FIG. 3) in which CPU 206 (FIG. 2) delays the predetermined amount of time and repeats steps 306–322 (FIG. 3). Conversely, if the call flag is set, processing transfers to test step 318.

In test step 318, CPU 206 (FIG. 2) determines whether a wait counter has expired. The wait counter is a value stored within CPU 206, e.g., within program RAM 208, and indicates an amount of time until a redial attempt is authorized. A call to host computer 106 (FIG. 1) is generally only pending when a previously attempted call failed and the call must be re-attempted. The wait counter is used to allow a predetermined amount of time, e.g., an integer multiple of the period of time of delay in step 304, to expire between attempted calls to host computer 106. If the wait counter indicates the predetermined time has elapsed, processing transfers to step 320 in which a call is placed to host computer 106 in a manner described more completely below. Conversely, if the wait counter does not indicate that the predetermined amount of time has expired, processing transfers to step 322 in which CPU 206 (FIG. 2) decrements the wait counter. Processing transfers from step 322 (FIG. 3) to step 304 in which CPU 206 (FIG. 2) delays the predetermined amount of time and repeats steps 306–322.

Figure 4:
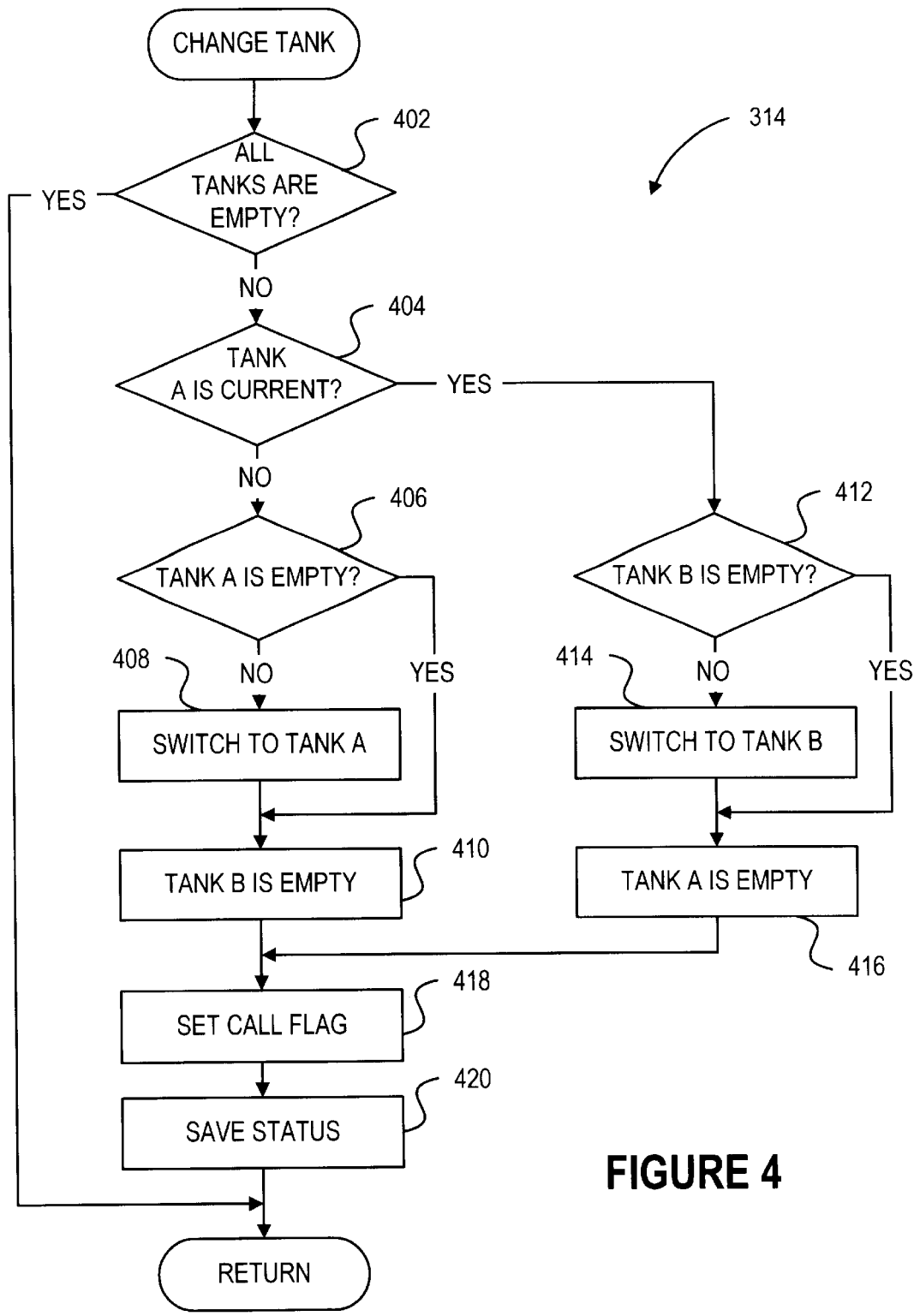
FIG. 4 is a logic flow diagram illustrating the changing of pressurized gas supplies by the smart switch of FIG. 2.

As described above, CPU 206 changes supply tanks if the measured pressure is below a predetermined threshold in step 314. Step 314 is shown in greater detail as logic flow diagram 314 (FIG. 4). In test step 402, CPU 206 (FIG. 4) determines whether both tanks are empty. In this illustrative embodiment, CPU 206 maintains an empty flag for each supply tank controlled by smart switch 100, e.g., supply tanks 202A–B. Each empty flag is cleared when smart switch 100 is reset by service personnel in the manner described below and is set in either step 410 or step 416 as described below. CPU 206 displays the status of each supply tank as represented by the respective empty flags. For example, A empty LED 226 is set according to the state of the empty flag of supply tank 202A such that A empty LED 226 is turned on if the empty flag of supply tank 202A to indicate the empty state of supply tank 202A. B empty LED 226 similarly indicates the empty status of supply tank 202B as represented by the empty flag of supply tank 202B. By reference to empty flags for supply tanks 202A–B, CPU 206 determines whether both supply tanks are empty.

If both supply tanks are empty, processing according to logic flow diagram 314, and therefore step 314 (FIG. 3), completes and no action is taken. Conversely, if either tank is not empty, processing transfers to test step 404 (FIG. 4).

In test step 404, CPU 206 (FIG. 2) determines whether supply tank 202A is current. CPU 206 knows which of supply tanks 202A–B is currently coupled to outlet line 203 by switching valve 204 because CPU 206 directly controls switching valve 204 at control line 205. The state of control line 205 is stored within CPU 206 as a current flag. If supply tank 202A is current, processing transfers to test step 412 (FIG. 4).

In test step 412, CPU 206 (FIG. 2) determines whether supply tank 202B is empty by reference to the empty flag for supply tank 202B. If supply tank 202B is not empty, processing transfers to step 414 (FIG. 4) in which CPU 206 (FIG. 2) causes switching valve 204 to couple supply tank 202B to outlet line 203. If supply tank 202B is empty, CPU 206 skips step 414 (FIG. 4). In step 416, CPU 206 (FIG. 2) sets the empty flag of supply tank 202A to indicate that supply tank 202A is empty. CPU 206 (FIG. 2) also illuminates A empty LED 226 to display the empty status of supply tank 202A.

If, in test step 404 (FIG. 4), CPU 206 (FIG. 2) determines that supply tank 202B is current, processing transfers from test step 404 (FIG. 4) to test step 406. In test step 406, CPU 206 (FIG. 4) determines whether supply tank 202A is empty by reference to the empty flag of supply tank 202A. If supply tank 202A is not empty, processing transfers to step 408 (FIG. 4) in which CPU 206 (FIG. 2) causes switching valve 204 to couple supply tank 202A to outlet line 203. If supply tank 202A is empty, CPU 206 skips step 408 (FIG. 4). In step 410, CPU 206 (FIG. 2) sets the empty flag of supply tank 202B to indicate that supply tank 202B is empty. CPU 206 (FIG. 2) also illuminates B empty LED 228 to display the empty status of supply tank 202.

Processing transfers from either step 410 (FIG. 4) or step 416 to step 418 in which CPU 206 (FIG. 2) sets the call flag to indicate that a call is pending to host computer 106 (FIG. 1). Thus, CPU 206 (FIG. 2) schedules a call to host computer 106 to inform host computer 106 of the emptying of one of supply tanks 202A–B.

In step 420 (FIG. 4), CPU 206 (FIG. 2) stores the current status of smart switch 100, and in particular the updated states of empty flags for supply tanks 202A–B, within location identifier 214. Accordingly, if power is cut from smart switch 100 and later reapplied, the accurate state of supply tanks 202A–B will be displayed as described above with respect to step 302 (FIG. 3). After step 418, processing according to logic flow diagram 314, and therefore step 314 (FIG. 3), completes.

Figure 5:
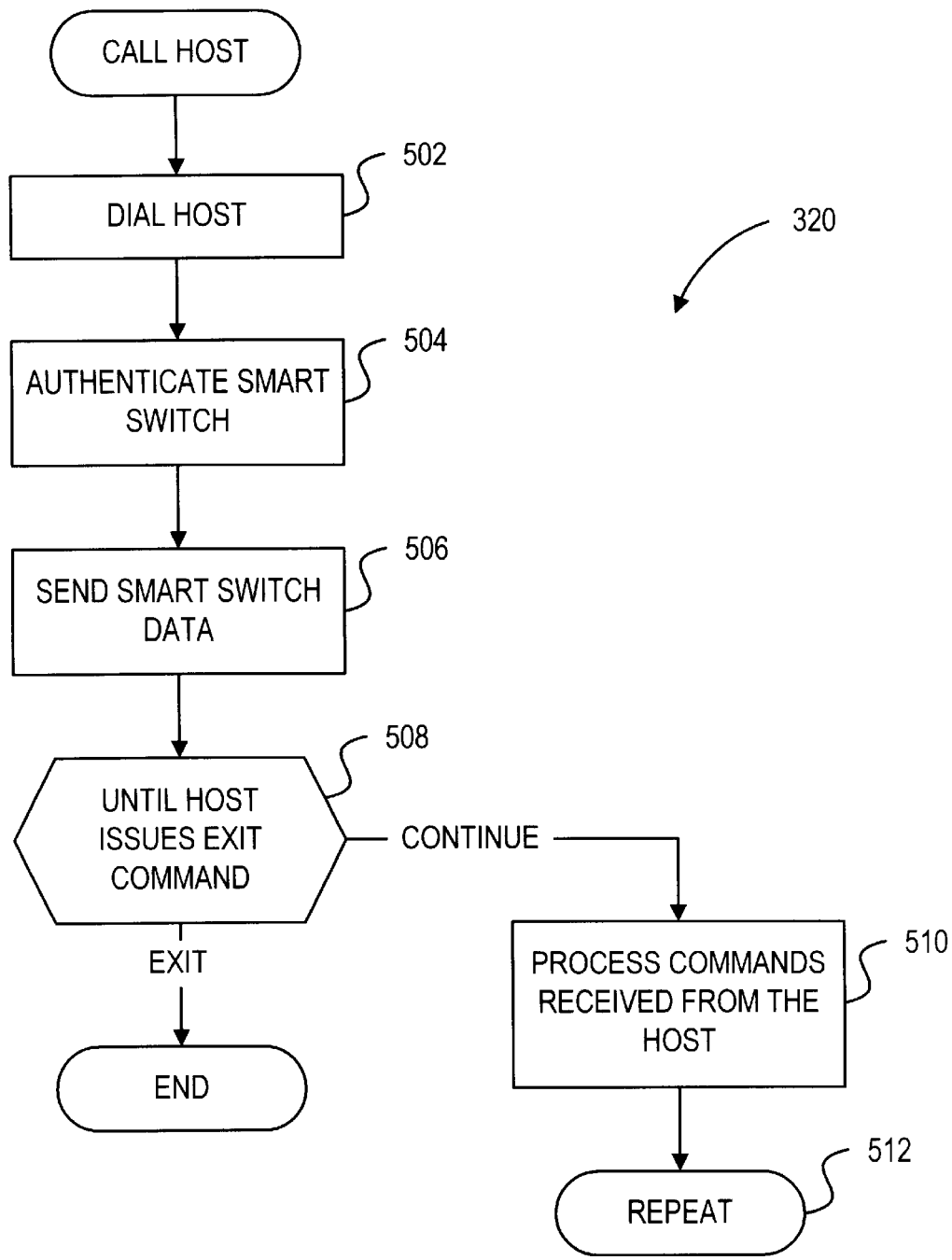
FIG. 5 is a logic flow diagram illustrating communication between the smart switch and the host computer in accordance with the present invention.

Thus, when pressure in the active supply tank drops below the predetermined pressure threshold, CPU 206 switches the active supply tank and sets a flag to remotely signal the switching of tanks to host computer 106. The remote signaling of step 320 (FIG. 3) is shown in greater detail as logic flow diagram 320 (FIG. 5).

In step 502, CPU 206 (FIG. 2) dials host computer 106 (FIG. 1). In particular, CPU 206 (FIG. 2) retrieves from program ROM 210 a telephone number at which host computer 106 can be reached through PSTN 102 and sends the telephone number, along with data representing a dial command, to modem 212. Dialing through a modem is conventional. In dialing host computer 106 in step 502 (FIG. 5), CPU 206 (FIG. 2) waits for a predetermined amount of time for a connection to be established as indicated by a carrier signal and for an acknowledgment signal (ACK) from host computer 106. The ACK from host computer 106 can generally be any data accepted by CPU 206 as such. In this illustrative embodiment, the ACK is a single, predetermined ASCII character. If the carrier signal is not established within a predetermined amount of time (e.g., 30 seconds) or is dropped prior to receipt of the ACT from host computer 106, CPU 206 logs an error and the call flag remains set such that CPU 206 re-attempts to call host computer 106 in a subsequent performance of step 320 (FIG. 3).

Figure 6:
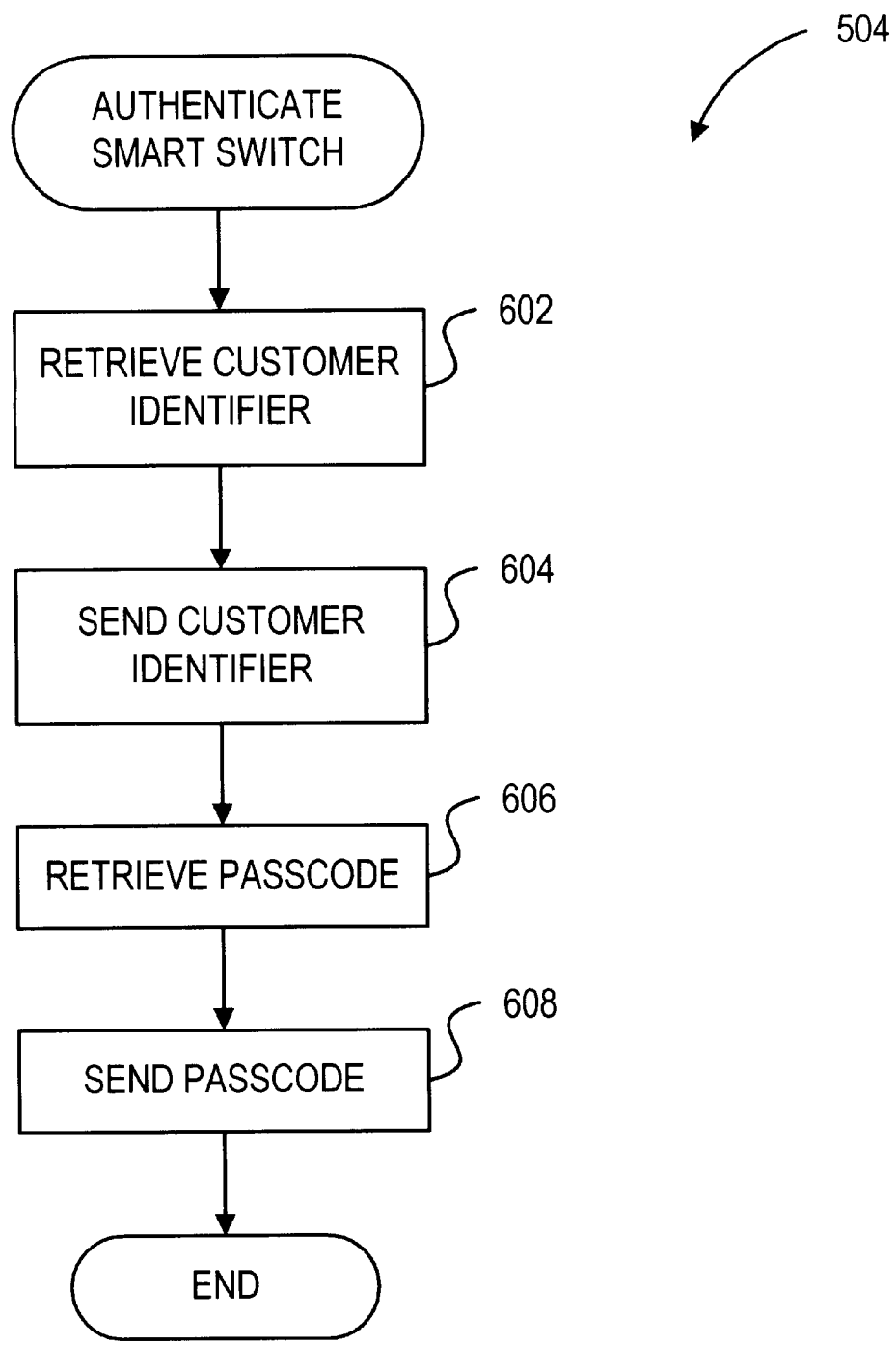
FIG. 6 is a logic flow diagram of the authentication of the smart switch.

In step 504 (FIG. 5), CPU 206 (FIG. 2) authenticates itself with host computer 106. In this illustrative embodiment, CPU 206 authenticates itself by sending data identifying the particular installation of smart switch 100 as represented in location identifier 214 and by sending an associated passcode. Step 504 (FIG. 5) is shown in greater detail as logic flow diagram 504 (FIG. 6). In step 602, CPU 206 retrieves the location identifier of smart switch 100, e.g., location identifier 214 (FIG. 2). In step 604 (FIG. 6), CPU 206 sends the location identifier to host computer 106. After sending the location identifier of smart switch 100, CPU 206 waits for acknowledgment from host computer 106 and continues to detect that the carrier signal is maintained. Host computer 106 can send a retry signal (e.g., a single ASCII character— "R") to thereby request re-submission of the location identifier of smart switch 100. If, within a predetermined amount of time, CPU 206 does not receive an acknowledgment or a retry signal or loses the carrier signal, an error is logged and the call flag remains set. If a retry signal is received by CPU 206, CPU 206 sends the location identifier again in the same manner. CPU 206 is configured to resend the location identifier up to a predetermined maximum number of times, e.g., typically a relatively small number, once, or no retries at all.

Once receipt of the location identifier of smart switch 100 is acknowledged and such acknowledgment is received by CPU 206, CPU 206 retrieves a passcode from program ROM 210 in step 606 and sends the passcode to host computer 106 in step and awaits acknowledgment by host computer 106. The passcode is maintained in secrecy and prevents unauthorized crackers from posing as smart switch 100 to obtain customer information from host computer 106. Such crackers would have to obtain both the location identifier of a particular installation of smart switch 100 and the secret associated passcode. The passcode of smart switch 100 is stored in program ROM 210 and is periodically changed at the request of host computer 106 in the manner described more completely below. Frequently changing passcodes of smart switches makes unauthorized access of host computer 106 more difficult. CPU 206 waits for an acknowledgment or a retry signal and continues to monitor the carrier signal.

If, within a predetermined amount of time, CPU 206 does not receive an acknowledgment or a retry signal or loses the carrier signal, an error is logged and the call flag remains set. If a retry signal is received by CPU 206, CPU 206 sends the passcode again in the same manner. CPU 206 is configured to resend the passcode up to a predetermined maximum number of times, e.g., once. In this illustrative embodiment, both the location identifier and the associated passcode end with a carriage-return. In various illustrative embodiments, the passcode can be a sequence of alphanumeric characters of a fixed length of four, eight, or other lengths or can be variable in length.

Once receipt of the passcode of smart switch 100 is acknowledged by host computer 106 and such acknowledgment is received by CPU 206, CPU 206 sends status data of smart switch 100 to host computer 106 in step 506 (FIG. 5). The status data includes log data which can include, for example, information regarding prior failures to send data to host computer 106. In this illustrative embodiment, the status data also includes all status flags described herein, logged errors, data identifying a particular version of the computer instructions and data of program ROM 210, and an identifier of service key 252 if service key 252 is inserted. In the manner described above with respect to steps 502–504 (FIG. 5), CPU 206 (FIG. 2) can detect the loss of the carrier signal, can re-send the status data upon request by host computer 106, and detects acknowledgment by host computer 106 of receipt of the status data within a predetermined amount of time or logs an error otherwise.

Loop step 508 (FIG. 5) and repeat step 512 define a loop in which CPU 206 (FIG. 5) processes commands received from host computer 106 (FIG. 1). Thus, once smart switch 100 is authenticated and uploads the status data described above, host computer 106 controls the remainder of interaction between host computer 106 and smart switch 100. The result is that emulation of smart switch 100 by an unauthorized cracker to obtain customer information is futile. Smart switch 100 only responds to commands issued by host computer 106. During each iteration of the loop of steps 508–512 (FIG. 5), CPU 206 (FIG. 2) processes a received command in step 510 (FIG. 5). When the received command is an exit command, processing according to logic flow diagram 320, and therefore step 320 (FIG. 3), completes.

Figure 7:
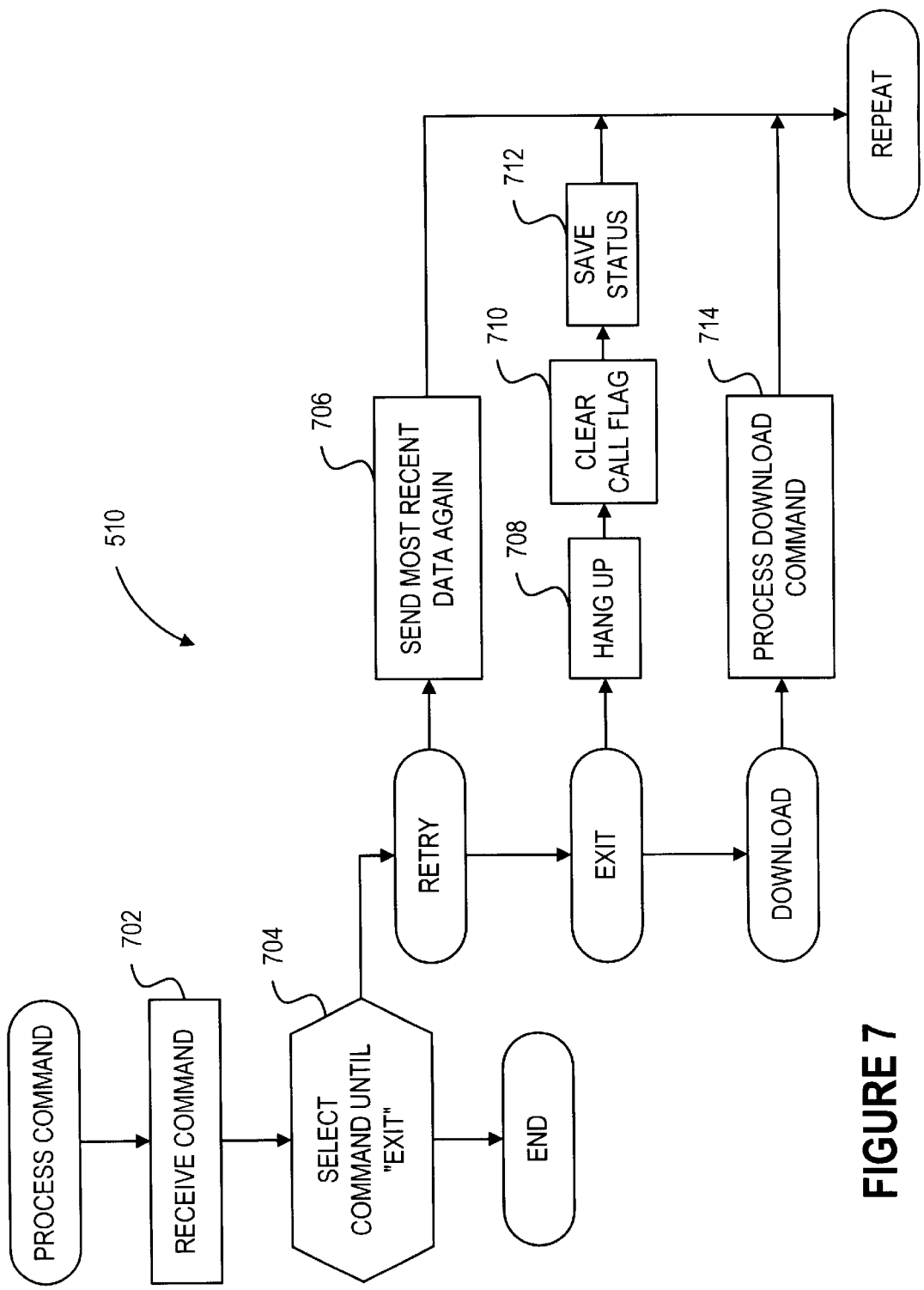
FIG. 7 is a logic flow diagram of the processing of commands from the host computer by the smart switch.

Step 510 (FIG. 5) is shown in greater detail as logic flow diagram 510 (FIG. 7). In step 702, CPU 206 receives a command from host computer 106. In this illustrative embodiment, a command is a single ASCII character. Loop step 704 defines a loop in which commands are processed according to steps 706–714 until an exit command is received. During each subsequent iteration of the loop of step 704, a new command is received from host computer 106. For each received command, CPU 206 determines which command is received and processes the command accordingly.

If the received command is a retry command, CPU 206 re-sends—in step 706—the most recently sent data to host computer 106. For example, if the authentication of step 504 is the most recently sent data from smart switch 100 to host computer 106, smart switch 100 repeats the authentication of step 504 in step 706 in response to a repeat command.

If the received command is an exit command, CPU 206 (FIG. 2) issues a hang-up command to modem 212 to disconnect from PSTN 102 (FIG. 1) and therefore from host computer 106 in step 708 (FIG. 7). In step 710, CPU 206 (FIG. 2) clears the call flag to indicate that no call is pending to host computer 106. In addition, CPU 206 (FIG. 2) stores the current state of smart switch in location identifier 214 in step 712 (FIG. 7).

Figure 8:
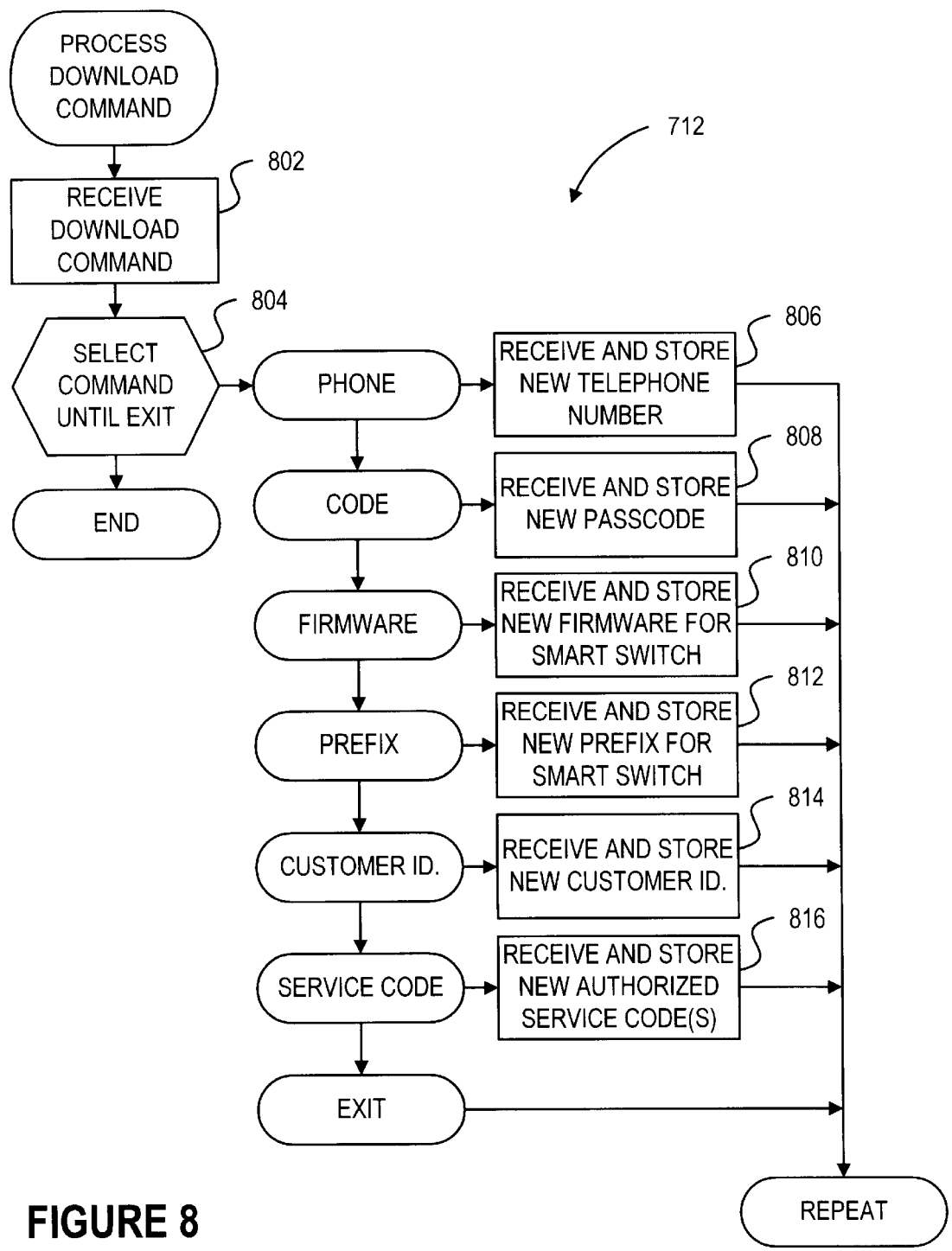
FIG. 8 is a logic flow diagram of the processing of download commands from the host computer by the smart switch.

If the received command is a download command, CPU 206 (FIG. 2) processes the download command in step 714 (FIG. 7) which is shown in greater detail as logic flow diagram 712 (FIG. 8). In step 802, CPU 206 (FIG. 2) receives a download command from host computer 106. In this illustrative embodiment, a download command is a single ASCII character. Loop step 804 (FIG. 8) defines a loop in which download commands are processed according to steps 806–816 until an exit command is received. During each subsequent iteration of the loop of step 804, a new download command is received from host computer 106. For each received download command, CPU 206 (FIG. 2) determines which download command is received and processes the command accordingly.

If the received download command is a phone command, CPU 206 (FIG. 2) receives from host computer 106 a new telephone number by which to contact host computer 106 and stores the new telephone number in program ROM 210 in step 806 (FIG. 8). As described above, program ROM 210 (FIG. 2) is EEPROM in this illustrative embodiment. Accordingly, the newly stored telephone number is persistently stored and the new telephone number is not lost upon powering off of smart switch 100.

If the received download command is a code command, CPU 206 receives from host computer 106 a new passcode and stores the new passcode in program ROM 210 in step 808 (FIG. 8).

If the received download command is a firmware command, CPU 206 (FIG. 2) receives new firmware from host computer 106 and stores the new firmware in program ROM 210 in step 810 (FIG. 8). The new firmware specifies a new behavior of CPU 206 (FIG. 2). Accordingly, the communication protocol described herein can be replaced with later, perhaps improved protocols. The new firmware can also include new predetermined threshold pressures at which supply tanks 202A–B are automatically switched.

If the received download command is a prefix command, CPU 206 (FIG. 2) receives a new prefix from host computer 106 and stores the new prefix in location identifier 214 in step 812 (FIG. 8). In this embodiment, a prefix is a portion of the location identifier that identifies a collection of locations. For example, a single customer can have multiple installations of smart switches and associated pressurized gas systems. In such circumstances, a prefix of the location identifier identifies such a collection of locations.

If the received download command is a customer identifier command, CPU 206 (FIG. 2) receives a new customer identifier from host computer 106 and stores the new customer identifier in location identifier 214 in step 814 (FIG. 8).

Figure 9A:
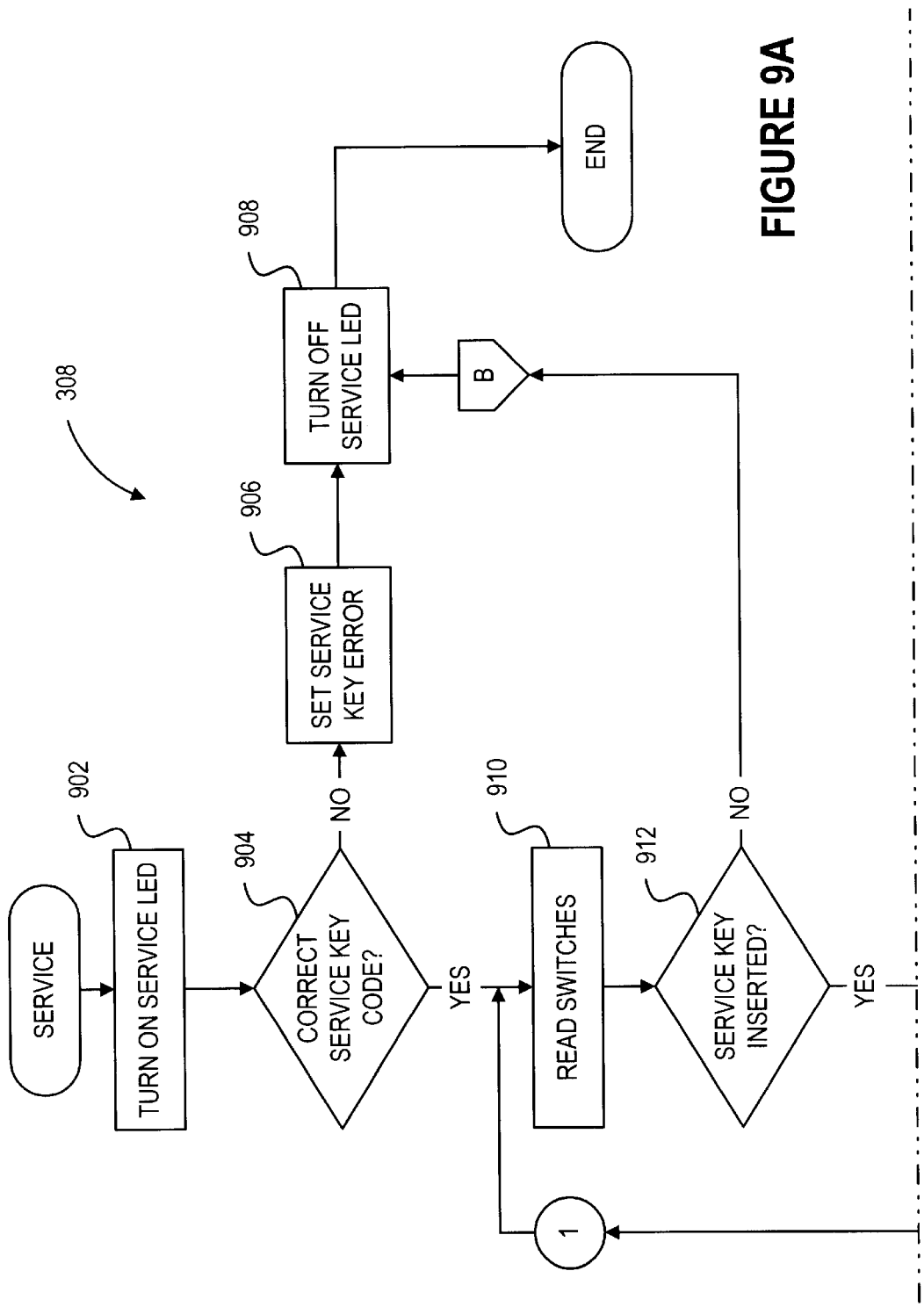
FIG. 9 is a logic flow diagram of processing by the smart switch of FIG. 2 in a service mode.

If the received download command is a service code command, CPU 206 (FIG. 2) receives new authorized service codes from host computer 106 and stores the new authorized service codes in step 814 (FIG. 8). The new authorized service codes specify which service keys authorize service for smart switch 100 as described below with respect to test step 904 (FIG. 9).

After either step 806, 808, 810, 812, 814, or 816, processing transfers to loop step 804 in which the next download command is received and processed. If the received download command is an exit command, processing according to logic flow diagram 712, and therefore step 712 (FIG. 7), completes. Thus, smart switch 100 terminates processing of download commands and returns to processing of ordinary commands according to logic flow diagram 510.

After either step 706 or 714, processing transfers to loop step 704 in which another command is received from host computer 106 and processed in the manner described above. After step 712, since the received command is an exit command, processing according to logic flow diagram 510, and therefore step 510 (FIG. 5), completes.

If the processed command of step 510 is an exit command, processing according to the loop of steps 508–512, and therefore logic flow diagram 320—and step 320 (FIG. 3), completes. After step 320, CPU 206 returns to step 304 and waits and repeats steps 304–322.

Service

As described above, CPU 206 enters a service mode in step 308 when service key 252 is inserted into smart switch 100. Step 308 is shown in greater detail as logic flow diagram 308 (FIG. 9).

In step 902, CPU 206 turns on service LED 256 to indicate that smart switch 100 is currently in service mode. In test step 904 (FIG. 9), CPU 206 (FIG. 2) determines whether service key 252 specifies a correct service key code. In particular, CPU 206 determines whether the service key code of service key 252 authorizes the holder of service key 252 to perform service functions on smart switch 100. If service key 252 is so authorized, processing transfers to step 910 which is described below. Conversely, if service key 252 is not so authorized, CPU 206 logs a service key error in step 906. As described above with respect to step 306 (FIG. 3), service functions are thereafter denied until service key 252 (FIG. 2) is removed from smart switch 100.

In step 908 (FIG. 9), CPU 206 (FIG. 2) turns off service LED 256 to indicate that smart switch 100 is no longer in the service mode. After step 908 (FIG. 9), processing according to logic flow diagram 308, and therefore step 308 (FIG. 3), completes.

In step 910 (FIG. 9), CPU 206 (FIG. 2) reads the respective states of switches 216, 218, 220, 242, and 244. Each of those switches has an active state and an inactive state. In one embodiment, each switch is active when pressed by a human user and is inactive otherwise. CPU 206 detects the active state by determining that a particular switch is closed. Alternatively, a switch can be open when activated.

In test step 912 (FIG. 9), CPU 206 (FIG. 2) determines whether service key 252 is still inserted in smart switch 100. If not, processing transfers to step 908 and smart switch 100 terminates service mode in the manner described above. Conversely, if service key 252 is still inserted in smart switch 100, processing transfers to test step 914 (FIG. 9).

In test step 914, CPU 206 (FIG. 2) determines whether set/change switch 216 is active. If so, processing transfers to step 916 (FIG. 9) in which CPU 206 (FIG. 2) enables establishment of the pressure threshold in a manner described more completely below. Conversely, if set/change switch 216 is inactive, processing transfers to test step 918 (FIG. 9).

In test step 918, CPU 206 (FIG. 2) determines whether reset switch 218 is active. If so, processing transfers to step 920 (FIG. 9) in which CPU 206 (FIG. 2) resets the respective represented states of supply tanks 202A–B in a manner described more completely below. Conversely, if reset switch 216 is inactive, processing transfers to test step 922 (FIG. 9).

In test step 922, CPU 206 (FIG. 2) determines whether switch tanks switch 220 is active. If so, processing transfers to step 924 (FIG. 9) in which CPU 206 (FIG. 2) switches which of supply tanks 202A–B is coupled to outlet line 203 by switching valve 204 in a manner described more completely below.

From any of steps 916, 920, or 924—or if switch tank switch 220 is inactive in test step 922, processing transfers to step 910 and processing according to logic flow diagram 308 continues in the manner described above. Thus, while service key 252 is valid and inserted in smart switch 100, switches 216–218 are enabled for performance of various service functions.

Figure 10A:
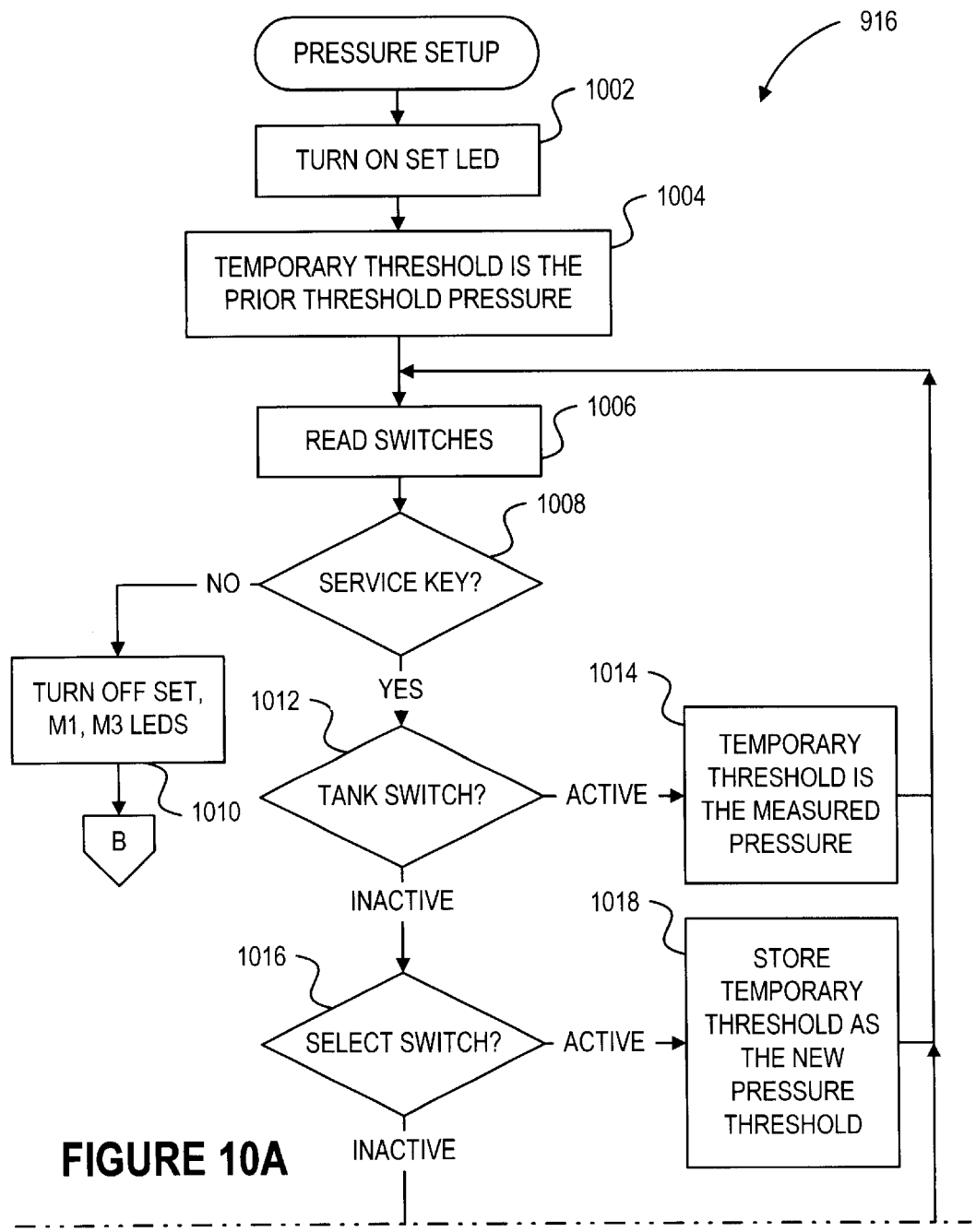
FIG. 10 is a logic flow diagram of establishment of the predetermined threshold pressure within the smart switch of FIG. 2 in accordance with the present invention.
Figures 10, 10B:
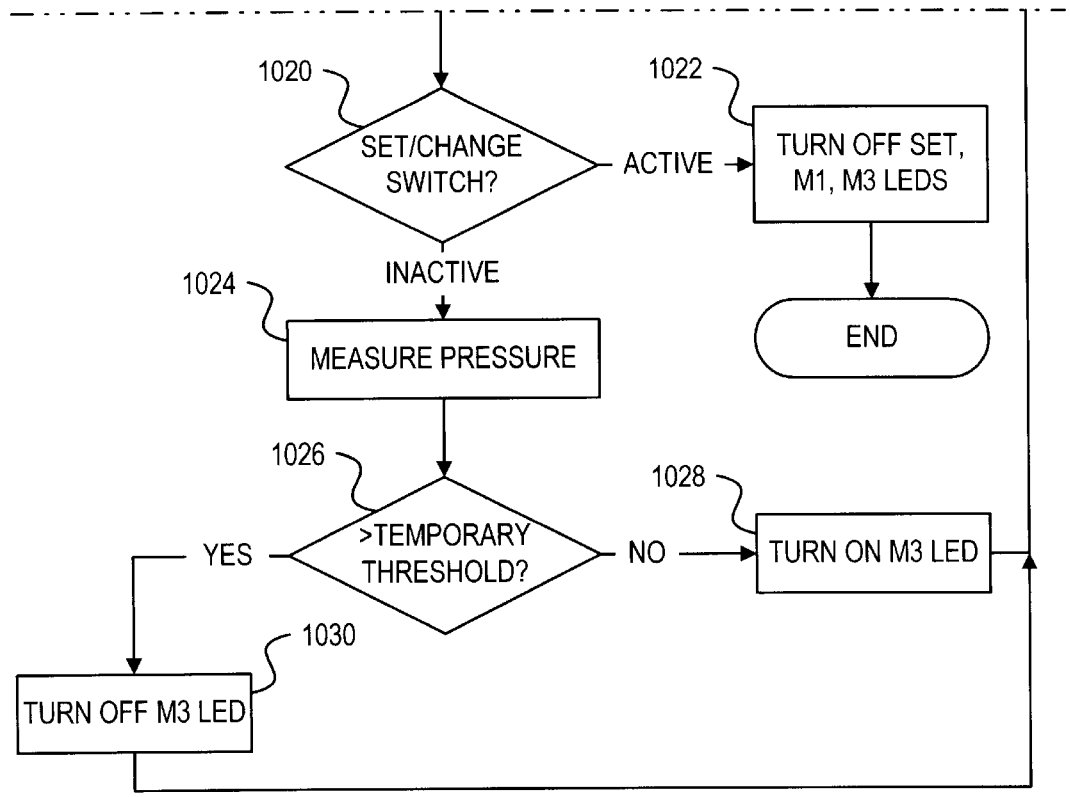

As described above, the predetermined threshold pressure at which supply tanks 202A–B are determined to be empty is set by service personnel at step 916 (FIG. 9). Step 916 is shown in greater detail as logic flow diagram 916 (FIG. 10). Before describing the specific steps taken by CPU 206 (FIG. 2) to enable setting of the pressure threshold, the process is described from the perspective of the service technician. First, the service technician initiates service mode by inserting service key 252 into smart switch 100. In response, service LED 256 illuminates. To set the pressure threshold to a target pressure, the service technician connects a supply tank with at least the target pressure of pressurized gas inside the supply tank. To illustrate this process, supply tank 202B is current and the service technician has attached supply tank 202A containing at least the target pressure of pressurized gas. The service technician then makes supply tank 202A current by pressing tank switch 220, thereby causing CPU 206 to switch tanks as described herein with respect to step 924 (FIG. 9). LED 238 illuminates to indicate supply tank 202A is now selected. The service technician presses set switch 216 (FIG. 2). In response, CPU 206 performs the pressure set-up procedure of step 916 (FIG. 9). Set LED 224 illuminates to indicate that pressure threshold set-up is in progress.

In this pressure set-up procedure, M3 LED 262 indicates whether the pressure of supply tank 202A is above or below the selected pressure threshold. Initially, the selected pressure threshold is the previous pressure threshold as described below. The service technician adjusts the pressure of outlet line 203 from supply tank 202A, perhaps adjusting the regulator of supply tank 202A and/or allowing gas to escape through pressurized gas system 104 (FIG. 1). As the gas pressure at outlet line 203 rises above or falls below the last selected pressure threshold, M3 LED 262 indicates the gas pressure as above or below the last selected pressure threshold.

When the service technician has established the desired pressure threshold at outlet line 203 from supply tank 202A, the service technician presses tank switch 220. The current gas pressure within outlet line 203 is recorded as the selected pressure threshold.

The service technician then presses select switch 244 to cause the selected pressure threshold to be stored as the new pressure threshold at which tanks are switched automatically by smart switch 100. By pressing set/change switch 216, the service technician terminates the pressure set-up procedure. Set LED 224 is no longer illuminated to indicate that smart switch 100 is no longer conducting pressure threshold set-up. The service technician then removes service key 252 to terminate the service mode of smart switch 100. Of course, before removing service key 252, the service technician can perform other service functions as described herein.

Smart switch 100 conducts the pressure threshold described above in the manner illustrated by logic flow diagram 916 (FIG. 10).

In step 1002 (FIG. 10), CPU 206 (FIG. 2) illuminates set LED 224. In step 1004 (FIG. 10), CPU 206 (FIG. 2) sets a temporary pressure threshold to the value of the current pressure threshold.

In step 1006 (FIG. 10), CPU 206 (FIG. 2) reads the current state of switches 216, 218, 220, 242, and 244. In test step 1008 (FIG. 10), CPU 206 (FIG. 2) determines whether service key 252 is inserted in smart switch 100.

If service key 252 is not inserted, CPU 206 turns off set LED 224, MI LED 258, and M3 LED 262 in step 1010 (FIG. 10) and processing transfers to step 908 (FIG. 9) in which service mode is terminated in the manner described above. Conversely, if service key 252 (FIG. 2) remains inserted in smart switch 100, processing transfers to step 1012 (FIG. 10).

In test step 1012, CPU 206 (FIG. 2) determines whether switch tanks switch 220 is active. If so, CPU 206 (FIG. 2)—in step 1014—sets the temporary pressure threshold to the last measured pressure at outlet line 203, e.g., at the last performance of step 1024 (FIG. 10). After step 1014, CPU 206 (FIG. 2) returns to step 1006 (FIG. 10) and performs another iteration of steps 1006–1030. Conversely, if switch tanks switch 220 is inactive, processing transfers to test step 1016.

In test step 1016, CPU 206 (FIG. 2) determines whether select switch 242 is active. If so, CPU 206 (FIG. 2) stores the temporary pressure threshold as the new pressure threshold which causes automatic tank switching by smart switch 100 in step 1018. After step 1018, CPU 206 (FIG. 2) returns to step 1006 (FIG. 10) and performs another iteration of steps 1006–1030. Conversely, if select switch 242 is inactive, processing transfers to test step 1016.

In test step 1020, CPU 206 (FIG. 2) determines whether set/change switch 216 is active. If so, CPU 206 (FIG. 2) terminates the pressure threshold set-up procedure by turning off set LED 224, M1 LED 258, and M3 LED 262 in step 1022 (FIG. 10) and completing processing according to logic flow diagram 916, and therefore step 916 (FIG. 9). Conversely, if set/change switch 216 is inactive, processing transfers to step 1024.

In step 1024, CPU 206 (FIG. 2) reads the current pressure of the current tank, e.g., supply tank 202A, in the manner described above with respect to test steps 406 (FIG. 4) and 412. In test step 1026 (FIG. 10), CPU 206 (FIG. 2) compares the current pressure to the temporary pressure threshold. If the current pressure is greater than the temporary pressure threshold, processing transfers to step 1030 in which CPU 206 (FIG. 2) turns off M3 LED 262. Conversely, if the current pressure is not greater than the temporary pressure threshold, processing transfers to step 1028 in which CPU 206 illuminates M3 LED 262. Thus, M3 LED 262 is illuminated when the current supply tank, e.g., supply tank 202A, is at or below the temporary pressure threshold. Processing transfers from either step 1028 or step 1030 to step 1006 in which CPU 206 performs another iteration of steps 1006–1030.

Thus, the service technician is able to establish a new threshold pressure at which supply tanks 202A–B are determined to be empty.

Figure 11:
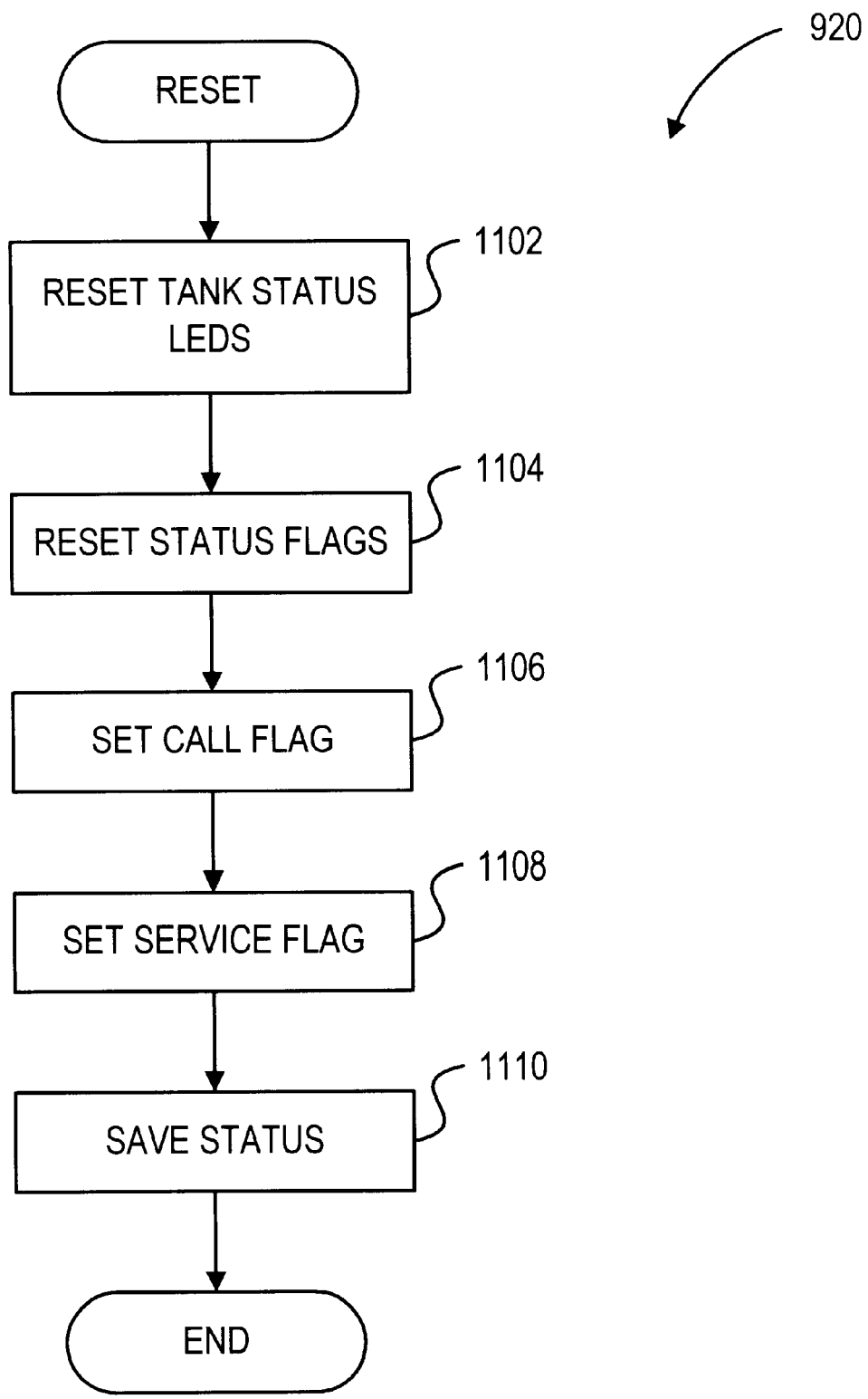
FIG. 11 is a logic flow diagram of the resetting of the smart switch of FIG. 2.

As described above, smart switch 100 is reset in step 920 when reset switch 218 is pressed. Typically, a service technician resets smart switch 100 when one or more of supply tanks 202A–B has been replaced with a full supply tank. Step 920 is shown in greater detail as logic flow diagram 920 (FIG. 11). In step 1102, CPU 206 (FIG. 2) turns off A empty LED 226 and B empty LED 228. In step 1104 (FIG. 11), CPU 206 (FIG. 2) resets tank empty flags for both supply tanks 202A–B to indicate that neither supply tank is currently empty.

In step 1106 (FIG. 11), CPU 206 (FIG. 2) sets the call flag to indicate that a call to host computer 106 is pending. Setting the call flag will cause smart switch 100 to call host computer 106 and inform host computer 106 that service has been performed and that supply tanks 202A–B are no longer empty. In step 1108 (FIG. 11), CPU 206 (FIG. 2) sets a service flag to indicate service has been performed and such is indicated to host computer 106 when the next call is placed.

In step 1110 (FIG. 11), CPU 206 (FIG. 2) saves the current status of smart switch 100 as represented in various flags in the EEPROM of location identifier 214 such that the state persists through absence of power to smart switch 100.

After step 1110 (FIG. 11), processing according to logic flow diagram 920, and therefore step 920 (FIG. 9), completes and smart switch 100 is reset to a known, predetermined state.

Figure 12:
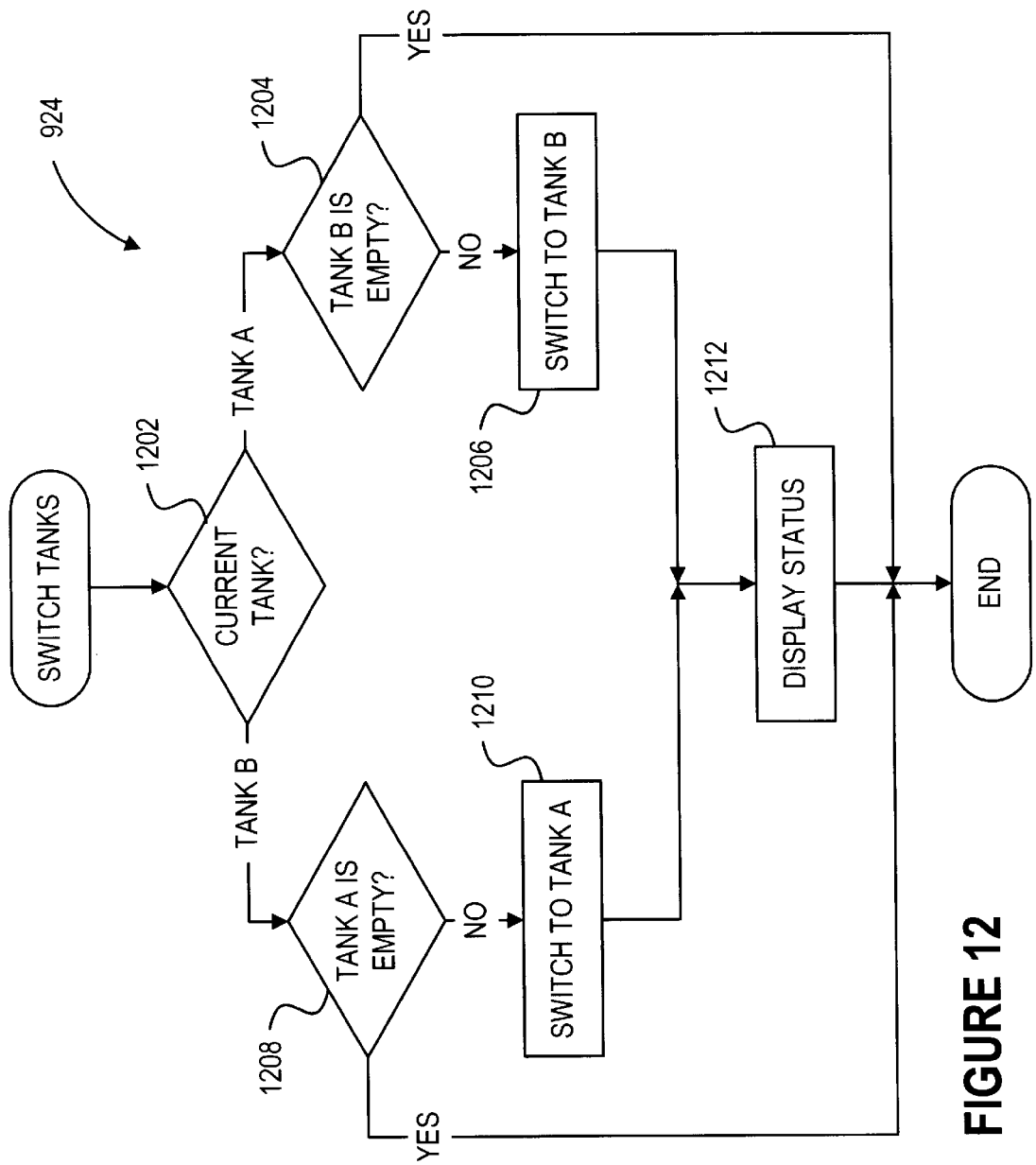
FIG. 12 is a logic flow diagram of the switching of pressurized gas supplies by the smart switch of FIG. 2.

As described above, the service technician can manually switch the current supply tank between supply tanks 202A–B by pressing switch tank switch 220, thereby causing CPU 206 to perform step 924 (FIG. 9). Manually switching tanks can be useful in a number of situations. For example, if a service technician wishes to replace both supply tanks, the service technician can replace the inactive supply tank, manually switch tanks, then replace the formerly active—now inactive—supply tank. In addition, after replacing one or more supply tanks and resetting tank status as described above with respect to FIG. 11, the service technician can ensure accurate representation of the status of all supply tanks by manually switching from tank to tank and allowing smart switch 100 to evaluate the pressure of each tank relative to the pressure threshold. Step 924 is shown in greater detail as logic flow diagram 924 (FIG. 12).

In test step 1202, CPU 206 (FIG. 2) determines which of supply tanks 202A–B is currently coupled to outlet line 203. Since CPU 206 controls which of supply tanks 202A–B is coupled to outlet line 203 by the signal at control line 205, CPU 206 makes such a determination by noting the state of control line 205. In this illustrative embodiment, the state of control line 205 is also represented by a current tank flag in the state of smart switch 100. If supply tank 202A is current, processing transfers to test step 1204 (FIG. 12). If supply tank 202B is current, processing transfers to test step 1208.

In test step 1204, CPU 206 (FIG. 2) determines whether supply tank 202B is empty according to the empty flag corresponding to supply tank 202B. If supply tank 202B is not empty, CPU 206 changes the signal on control line 205 to make supply tank 202B current in step 1206 (FIG. 12). In addition, CPU 206 (FIG. 2) records supply tank 202B as the current supply tank in the current tank flag.

In test step 1208 (FIG. 12), CPU 206 (FIG. 2) determines whether supply tank 202A is empty according to the empty flag corresponding to supply tank 202A. If supply tank 202A is not empty, CPU 206 changes the signal on control line 205 to make supply tank 202A current in step 1210 (FIG. 12). In addition, CPU 206 (FIG. 2) records supply tank 202A as the current supply tank in the current tank flag.

After either step 1206 (FIG. 12) or step 1210, processing transfers to step 1212 in which CPU 206 (FIG. 2) displays the updated status. In particular, LEDs 238–240 are updated to accurately reflect the current supply tank.

If supply tank 202B is determined to be empty in test step 1204 (FIG. 12), steps 1206 and 1212 are skipped by CPU 206 (FIG. 2). Similarly, if supply tank 202A is determined to be empty in test step 1208 (FIG. 12), steps 1210 and 1212 are skipped by CPU 206 (FIG. 2). After step 1212 (FIG. 12), or after either of test steps 1204, 1208 if the corresponding supply tank is empty, processing according to logic flow diagram 924, and therefore step 924 (FIG. 9), completes. Thus, by pressing switch tanks switch 218 (FIG. 2), the service technician can force switching between supply tanks 202A–B regardless of the amount of pressurized gas contained therein.

Host Computer

Logic flow diagram 1300 (FIG. 13) illustrates processing by host computer 106 (FIG. 1) in response to a call from smart switch 100. In step 1302 (FIG. 13), host computer 106 (FIG. 1) receives a call from smart switch 100 through PSTN 102. Accordingly, host computer 106 includes a modem which is configured to answer calls placed to the access telephone number dialed by smart switch 100. Answering by a modem of a computer is conventional and is not described further herein.

In step 1304 (FIG. 13), host computer 106 (FIG. 1) authenticates the calling smart switch. In particular, host computer receives a location identifier and an associated passcode from the calling smart switch. The calling smart switch is authenticated if the associated passcode matches a predetermined passcode associated with the location identifier of the calling smart switch in a database within host computer 106. As described above and below, host computer 106 sets and downloads the passcode of smart switches such as smart switch 106. Accordingly, host computer 106 knows the passcodes of all smart switches configured to communicate with host computer 106. Authentication failure can cause host computer (i) to request re-attempting authentication by the calling smart switch, (ii) to terminate the call, and/or (iii) to log the failed authentication for subsequent troubleshooting.

In step 1306 (FIG. 13), after successful authentication, host computer 106 (FIG. 1) receives the status data of the calling smart switch, e.g., sent in step 506 (FIG. 5). Host computer 106 (FIG. 1) notes the identification of the calling smart switch, e.g., retrieved from a database associating location identifiers with addresses and customer information, and which of supply tanks 202A–B is empty. Host computer 106 can also store data identifying the type of supply tanks 202A–B installed at the location of the calling smart switch to thereby note the specific type of tank to be replaced.

In step 1308 (FIG. 13), host computer 106 (FIG. 1) dispatches a replacement supply tank. The dispatch can be (i) a simple report printed on a printer 114 to be noted by a human operator, (ii) a text message sent to a personal digital assistant (PDA) 112 through a wireless network, (iii) a text message sent to an alphanumeric pager 110, or (iv) a synthesized voice message to a cellular telephone 108 or to a radio transceiver 118 through a wireless network 116. The message can be sent directly to a service technician, e.g., out making deliveries. If the service technician currently has the type of supply tank which has just become empty and is reasonably near the location of the calling smart switch, the newly empty supply tank can be replaced within minutes of the initial automatic detection that the supply tank has become empty. Moreover, the management personnel at the installation of pressurized gas, i.e., the owner and operator of pressurized gas system 104, may be completely unaware that the supply tank has become empty and no action is required by such personnel to effect replacement of the empty supply tank.

Another particularly helpful feature of smart switch 100 and host computer 106 is the ability to change the behavior of smart switch 100 without direct contact with smart switch 100, i.e., at the control of host computer 106. In test step 1310 (FIG. 13), host computer 106 determines whether the passcode of the calling smart switch has expired. Host computer 106 can make such a determination in a number of ways. Host computer 106 can associate a passcode expiration date with each smart switch and can compare that date to the current date. The passcode expiration date can be calculated as a predetermined amount of time since the current passcode was issued to the calling smart switch. In one embodiment, the predetermined amount of time is one month. Alternatively, the expiration of a passcode can be based on the number of calls made to host computer by the calling smart switch. For example, a counter can be set to a predetermined number, e.g., ten, and can be decremented each time an associated smart switch calls host computer 106. Host computer 106 then determines that the passcode of the calling smart switch is expired when the counter is decremented to zero.

If the passcode of the calling smart switch has expired, processing transfers to step 1312 (FIG. 13) in which host computer 106 (FIG. 1) generates and downloads a new passcode for the calling smart switch. In this illustrative embodiment, host computer 106 generates the new passcode randomly and sends a download passcode command which is received and processed by the calling smart switch in the manner described above with respect to steps 714 (FIG. 7) and 808 (FIG. 8).

Figure 13A:
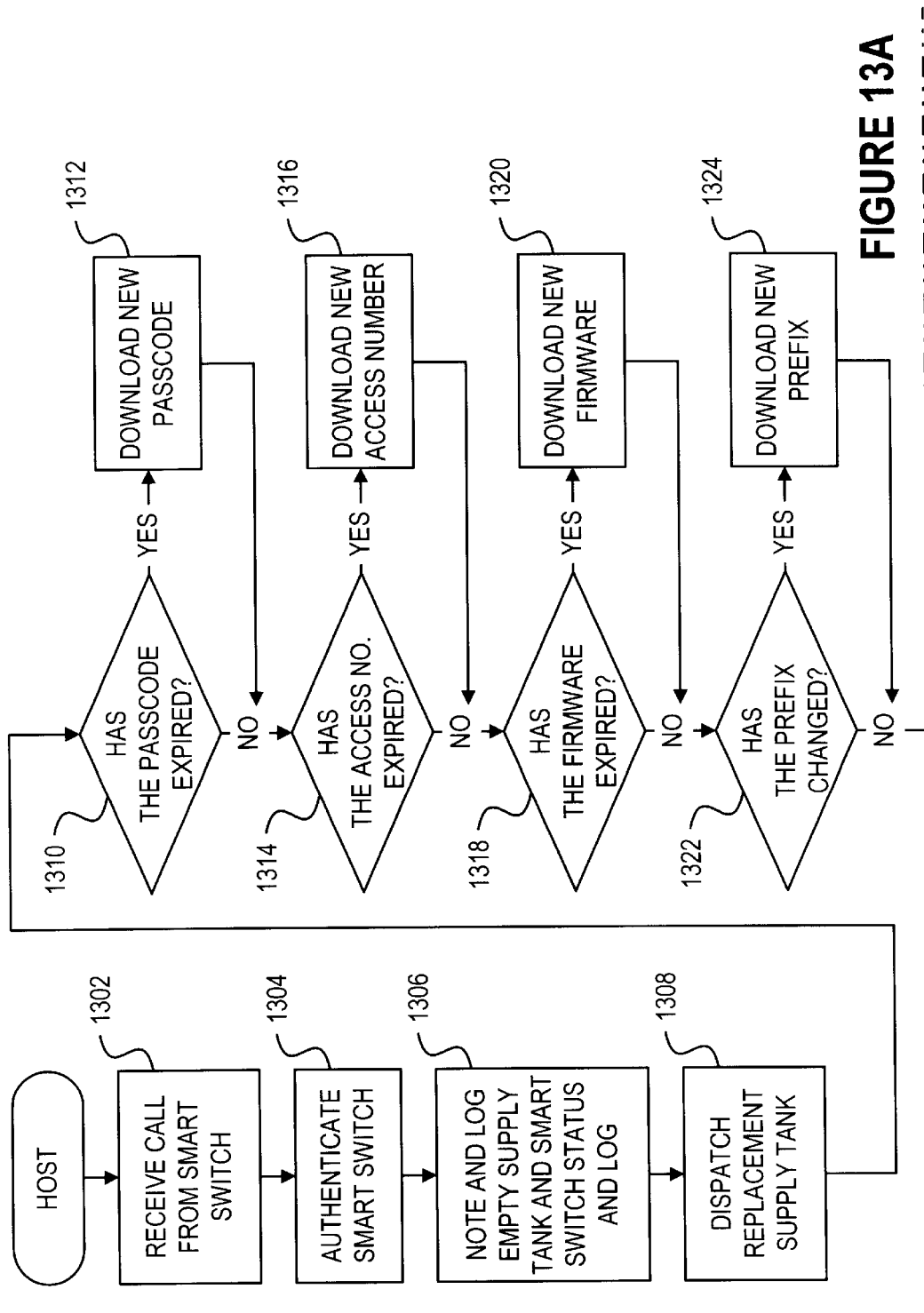
FIG. 13 is a logic flow diagram of processing by the host computer of FIG. 1 in accordance with the present invention.
Figure 13:
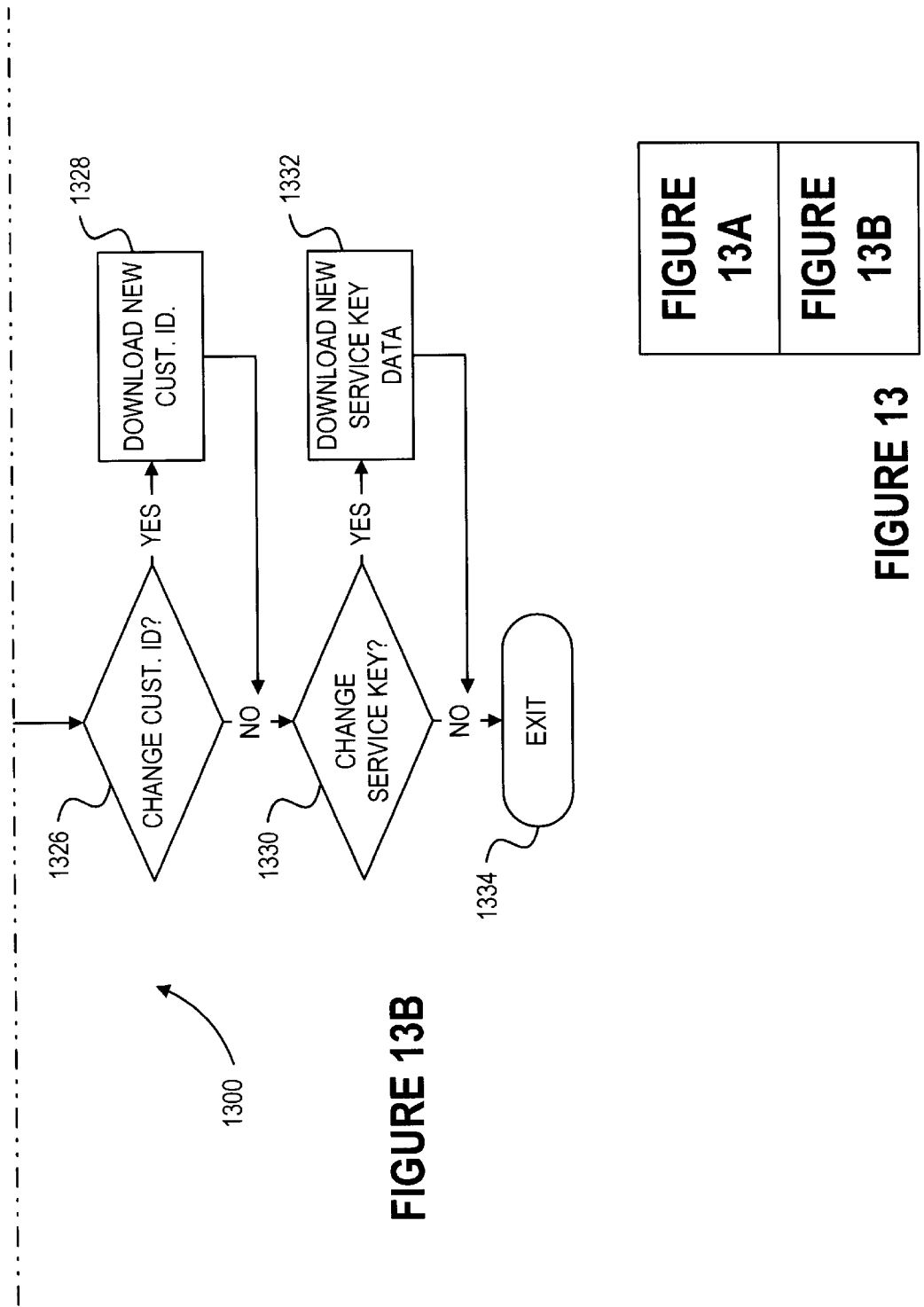
Figure 13:
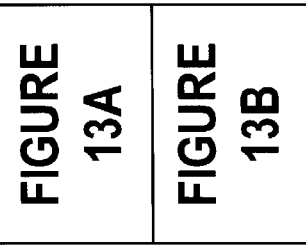

If the passcode of the calling smart switch has not expired, host computer 106 (FIG. 1) skips step 1312 (FIG. 13).

In test step 1314, host computer 106 (FIG. 1) determines whether the access telephone number used by the calling smart switch has expired. Host computer 106 can determine which access telephone number is dialed by the calling smart switch by simply knowing the telephone number associated with the telephone line on which the call is received. Alternatively, host computer 106 can receive the access telephone number as part of the smart switch status data received from the calling smart switch. Host computer 106 maintains a list of expired access telephone numbers and associated replacement access telephone numbers and determines whether a particular access telephone number is expired by reference to the list.

If the access telephone number used by the calling smart switch has expired, processing transfers to step 1316 (FIG. 13) in which host computer 106 (FIG. 1) downloads the associated replacement access telephone number to the calling smart switch. The calling smart switch processes the download command and new access telephone number in the manner described above with respect to steps 714 (FIG. 7) and 806 (FIG. 8).

If the access telephone number used by the calling smart switch has not expired, host computer 106 (FIG. 1) skips step 1316 (FIG. 13).

In test step 1318 (FIG. 13), host computer 106 (FIG. 1) determines whether the firmware used by the calling smart switch has expired. In this illustrative embodiment, smart switch status data received by host computer 106 in step 1306 (FIG. 13—and sent by smart switch 100) includes data identifying a particular version of firmware in use by the calling smart switch. Host computer 106 (FIG. 1) makes such a determination by comparing the version of the firmware currently in use by the calling smart switch to a most recent version of the firmware. If the firmware used by the calling smart switch is not the most recent version of the firmware, processing transfers to step 1320 (FIG. 13) in which host computer 106 (FIG. 1) downloads the most recent version of firmware to the calling smart switch in the manner described with respect to steps 714 (FIG. 7) and 810 (FIG. 8). Thus, changes made to firmware of smart switch 100 (FIG. 2), e.g., stored in program ROM 210, can be updated without ever requiring a service technician to visit the location of smart switch 100. This is particularly important when host computer 106 (FIG. 1) receives calls from many, e.g., hundreds or thousands of, smart switches such as smart switch 100. Any change of the firmware can be upgraded and each and every smart switch will download and install the new upgraded firmware whenever a call is placed to host computer 106 without any specific human intervention.

If the firmware used by the calling smart switch is the most recent version, host computer 106 skips step 1320 (FIG. 13).

In test step 1322, host computer 106 (FIG. 1) determines whether the location identifier prefix has changed. The location identifier prefix of smart switch 100 can change if an entire collection smart switches—to which smart switch 100 belongs—changes ownership, for example. If the location identifier prefix of the calling smart switch has changed, processing transfers to step 1324 in which host computer 106 downloads a new prefix in the manner described above with respect to steps 714 (FIG. 7) and 812 (FIG. 8).

If the prefix of the calling smart switch has not changed, host computer 106 (FIG. 1), skips step 1322 (FIG. 13).

In test step 1324, host computer 106 (FIG. 1) determines whether the customer identifier of the calling smart switch has changed. If a customer terminates service by host computer 106, the smart switch used by that customer can be returned and provided to a different customer. An operator of host computer 106 can specify that the smart switch previously assigned to the previous customer has been reassigned to the new customer. Accordingly, when the transferred smart switch next calls host computer 106, host computer 106 can assign a new customer identification to the calling smart switch in the manner described above with respect to steps 714 (FIG. 7) and 8114 (FIG. 8). The smart switch can be moved directly from the former customer to the new customer without any direct reprogramming by a service technician.

If the customer identifier of the calling smart switch has not changed, host computer 106 (FIG. 1) skips step 1328 (FIG. 13).

In test step 1330, host computer 106 (FIG. 1) determines whether the service key authorization data should be changed for the calling smart switch. As described above, smart switch 100 limits service access to those service keys with specific service codes in test step 904 (FIG. 9). If an operator of host computer 106 determines that the service codes authorized for a particular smart switch should be changed, the operator schedules the change in authorized service codes to be effected when the smart switch next calls host computer 106. In particular, host computer 106 downloads the new authorized service codes in the manner described above with respect to steps 714 (FIG. 7) and 816 (FIG. 8) in step 1332 (FIG. 13).

If the authorized service codes of the calling smart switch are correct, host computer 106 (FIG. 1) skips step 1332 (FIG. 13).

In terminal step 1 334, host computer 106 (FIG. 1) issues an exit command to the calling smart switch to thereby cause the calling smart switch to terminate the call and to clear the call flag of the calling smart switch such that the smart switch will continue to operate normally and not call host computer 106 until the next supply tank is empty.

Thus, in accordance with the present invention, a central host computer controls the interface with the smart switch. As a result, it is particularly difficult to extract customer information or other confidential information from host computer 106 by posing as a smart switch. In addition, host computer 106 acts as a centralized control center for controlling such things as passcodes, access telephone numbers, and firmware of many smart switches configured to interact with host computer 106, thereby saving tremendous human effort in maintain so many smart switches.

The above description is illustrative only and is not limiting. For example, while two supply tanks 202A–B are shown, it is appreciated that additional supply tanks can be coupled to a switching valve and supply tanks can be automatically coupled to output line 203, e.g., in a round robin fashion. In addition, while the PSTN is described as the communications medium between smart switch 100 and host computer 106, it is appreciated than many other communications media can be used, including wireless networks, computer networks, and the Internet, for example. Accordingly, the present invention is defined solely by the claims which follow and their full range of equivalents.

What is claimed is:

1. A method for administrating a remote installation of pressurized gas, the method comprising:

receiving data indicating that at least one pressurized gas supply at the remote installation has a gas pressure below a predetermined threshold pressure;

dispatching a replacement gas supply in response; and sending one or more commands through a communications network for execution by the remote installation.

2. The method of claim 1 wherein receiving data comprises:

receiving status data representing the status of the remote installation.

3. The method of claim 2 wherein the status data further includes identification of the pressurized gas supply.

4. The method of claim 1 wherein receiving data comprises receiving data through the communications network.

5. The method of claim 1 wherein dispatching comprises sending a signal through a dispatch communications network to a vehicle wherein the signal identifies the remote installation of pressurized gas.

6. The method of claim 5 wherein the dispatch communications network and the first-mentioned communications network are the same communications network.

* * * * *